(12) United States Patent  
Swartley et al.

(10) Patent No.: US 9,303,689 B2  
(45) Date of Patent: Apr. 5, 2016

(54) NON-RHYTHMICALLY SPACED ROLLING ELEMENTS FOR REDUCTION IN BEARING NON-REPEATABLE RUN-OUT

(71) Applicant: Roller Bearing Company of America, Inc., Oxford, CT (US)

(72) Inventors: Curtis M. Swartley, Torrington, CT (US); Alex Habibvand, Orange, CA (US)

(73) Assignee: Roller Bearing Company of America, Inc., Oxford, CT (US)

( * ) Notice: Subject to any disclaimer, the term of this patent is extended or adjusted under 35 U.S.C. 154(b) by 66 days.

(21) Appl. No.: 14/264,793

(22) Filed: Apr. 29, 2014

(65) Prior Publication Data

US 2015/0308500 A1 Oct. 29, 2015

(51) Int. Cl.  
F16C 33/37 (2006.01)  
F16C 19/06 (2006.01)  
F16C 33/32 (2006.01)

(52) U.S. Cl.  
CPC ............. F16C 33/37 (2013.01); F16C 19/06 (2013.01); F16C 33/32 (2013.01)

(58) Field of Classification Search  
CPC ............................ F16C 33/37; F16C 33/3706  
See application file for complete search history.

(56) References Cited

U.S. PATENT DOCUMENTS

| | | |
|---|---|---|
| 1,288,269 A | 12/1918 | Strom |
| 1,379,945 A | 5/1921 | Teetsow |
| 1,894,038 A | 1/1933 | Henderson |
| 1,924,037 A | 8/1933 | Henderson |
| 1,964,420 A | 6/1934 | Baninger |
| 2,983,559 A | 5/1961 | Blinder |
| 2,986,942 A | 6/1961 | De Lanty |
| 3,011,842 A | 12/1961 | Norris |
| 3,082,629 A | 3/1963 | Jones, Jr. et al. |
| 3,182,514 A | 5/1965 | Krupick et al. |
| 3,187,586 A | 6/1965 | Evenson |
| 3,327,538 A | 6/1967 | Krupick et al. |
| 3,336,810 A | 8/1967 | Schaffer et al. |
| 3,402,610 A | 9/1968 | Barnett |
| 3,425,759 A | 2/1969 | Schwarzschild |
| 3,843,108 A | 10/1974 | Krupick et al. |
| 3,882,583 A | 5/1975 | Thacker et al. |
| 3,897,985 A | 8/1975 | Davis et al. |
| 3,987,555 A | 10/1976 | Haagens et al. |
| 4,193,646 A | 3/1980 | Rokl et al. |
| 4,283,959 A | 8/1981 | Strittmatter et al. |

(Continued)

FOREIGN PATENT DOCUMENTS

| | | |
|---|---|---|
| EP | 2213892 A2 | 8/2010 |
| GB | 497584 | 12/1938 |

(Continued)

Primary Examiner — Thomas R. Hannon  
(74) Attorney, Agent, or Firm — MKG LLC

(57) ABSTRACT

A rolling element bearing includes an outer member having an outer member interior surface and an outer member exterior surface. The bearing includes an inner member having an inner member interior surface and an inner member exterior surface and a plurality of rolling elements disposed between the inner member and the outer member. The bearing includes a plurality of random-length slug separators. The separators are of a first length, a second length or a third length, which are not equal. One of the plurality of random-length slug separators is disposed adjacent to at least one of the plurality of rolling elements. The plurality of rolling elements are non-rhythmically spaced apart.

13 Claims, 34 Drawing Sheets

(56) References Cited

U.S. PATENT DOCUMENTS

| | | | |
|---|---|---|---|
| 4,451,098 | A | 5/1984 | Farley et al. |
| 4,572,337 | A | 2/1986 | Johansson |
| 4,611,701 | A | 9/1986 | Friedmann |
| 5,199,801 | A | 4/1993 | Grehn et al. |
| 5,450,770 | A | 9/1995 | Bellemore et al. |
| 5,723,923 | A | 3/1998 | Clagett |
| 5,904,426 | A | 5/1999 | Tsuru et al. |
| 5,927,858 | A * | 7/1999 | Agari ............... F16C 29/0609 384/45 |
| 6,095,009 | A | 8/2000 | Takagi |
| 6,144,128 | A | 11/2000 | Rosen |
| 6,170,993 | B1 | 1/2001 | Hurrell, II et al. |
| 6,232,671 | B1 | 5/2001 | Gottfried, Jr. |
| 6,415,676 | B1 | 7/2002 | Takagi et al. |
| 6,481,898 | B1 | 11/2002 | Yakura et al. |
| 6,561,054 | B1 | 5/2003 | Chiu et al. |
| 6,563,243 | B2 | 5/2003 | Obara et al. |
| 6,630,761 | B1 | 10/2003 | Gabrys |
| 6,779,419 | B2 * | 8/2004 | Yamaguchi ......... F16C 29/0642 384/51 |
| 6,854,351 | B2 | 2/2005 | Yabe et al. |
| 6,923,575 | B2 | 8/2005 | Kuo |
| 6,955,468 | B2 | 10/2005 | Yabe et al. |
| 6,995,529 | B2 | 2/2006 | Sibley |
| 7,008,113 | B2 | 3/2006 | Herles et al. |
| 7,051,617 | B2 | 5/2006 | Smith et al. |
| 7,159,481 | B2 | 1/2007 | Miyaguchi et al. |
| 7,293,543 | B1 | 11/2007 | Scekic |
| 7,758,245 | B2 | 7/2010 | Ishihara et al. |
| 8,021,053 | B2 | 9/2011 | Habibvand |
| 8,167,501 | B2 | 5/2012 | Perkinson et al. |
| 8,215,845 | B2 | 7/2012 | Habibvand |
| 8,240,231 | B2 | 8/2012 | Kwok |
| 8,242,649 | B2 | 8/2012 | Fradella |
| 8,651,810 | B2 | 2/2014 | Habibvand |
| 2001/0037669 | A1 | 11/2001 | Tanaka et al. |
| 2002/0078775 | A1 | 6/2002 | Akido |
| 2002/0187839 | A1 | 12/2002 | Young et al. |
| 2003/0172760 | A1 | 9/2003 | Ohkubo |
| 2004/0020317 | A1 | 2/2004 | Yamamoto |
| 2005/0076734 | A1 | 4/2005 | Miyaguchi et al. |
| 2006/0101935 | A1 | 5/2006 | Nakatani et al. |
| 2007/0211979 | A1 | 9/2007 | Habibvand |
| 2007/0269154 | A1 | 11/2007 | Habibvand |
| 2007/0297705 | A1 | 12/2007 | Hosoya et al. |
| 2009/0060706 | A1 | 3/2009 | Habibvand |
| 2009/0195096 | A1 | 8/2009 | Suzuki |
| 2010/0064828 | A1 | 3/2010 | Gisler et al. |
| 2010/0278470 | A1 | 11/2010 | Grull et al. |
| 2011/0129327 | A1 | 6/2011 | Habibvand |
| 2011/0311175 | A1 | 12/2011 | Damato et al. |
| 2012/0039557 | A1 | 2/2012 | Casteras |
| 2012/0195538 | A1 | 8/2012 | Hori et al. |
| 2012/0261536 | A1 | 10/2012 | McArthur et al. |
| 2013/0199314 | A1 * | 8/2013 | Habibvand ............. G01C 19/16 74/5.95 |
| 2013/0294716 | A1 | 11/2013 | Habibvand |
| 2014/0033859 | A1 | 2/2014 | Hilton et al. |

FOREIGN PATENT DOCUMENTS

| | | |
|---|---|---|
| GB | 784576 | 10/1957 |
| GB | 1067998 A | 5/1967 |
| JP | 2008267586 A | 11/2008 |
| JP | 2011169370 A | 9/2011 |
| JP | 2013137099 A | 7/2013 |
| WO | 2004098908 A1 | 11/2004 |
| WO | 2006089636 A1 | 8/2006 |
| WO | 2011066641 A1 | 6/2011 |
| WO | 2013005771 A1 | 1/2013 |
| WO | 2013108638 A1 | 7/2013 |
| WO | 2013166083 A1 | 11/2013 |

* cited by examiner

FIG. 3A
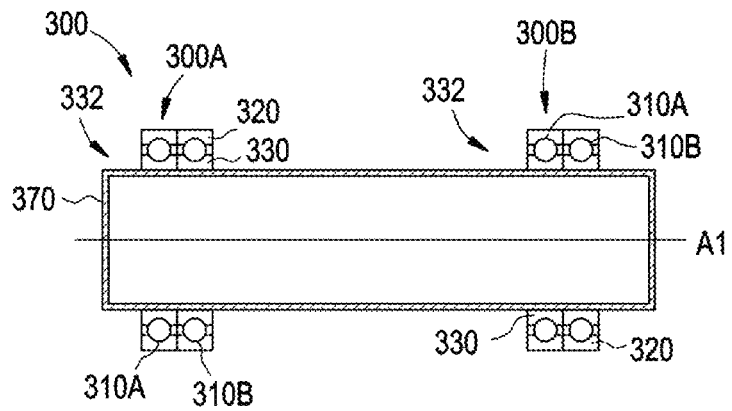
FIG. 3B
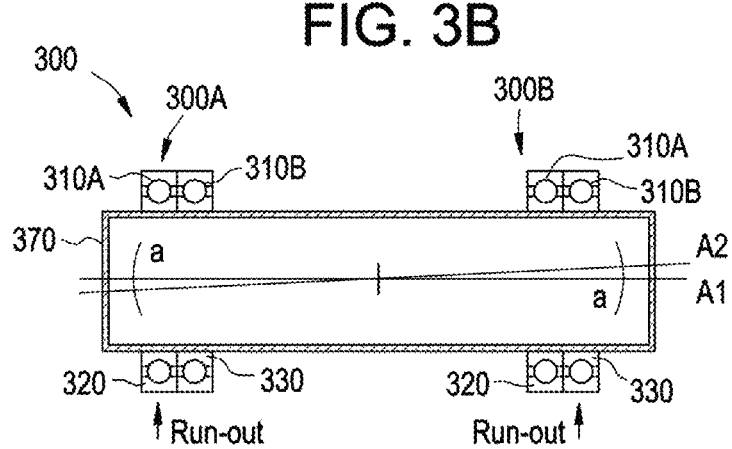
FIG. 4
| Waviness | | Non-Repeatable Radial Run-Out | System Non-Repeatable Angular Run-Out |
|---|---|---|---|
| 30° Arc Segment | 15° Arc Segment | | |
| 60 | 50 | 0.0000546 (Best Case) | 3.75 Arc Sec (Best Case) |
| 40 | 30 | 0.0000301 (Worst Case) | 2.07 Arc Sec (Worst Case) |
| 30 | 15 | 0.0000285 (Worst Case) | 1.96 Arc Sec (Worst Case) |

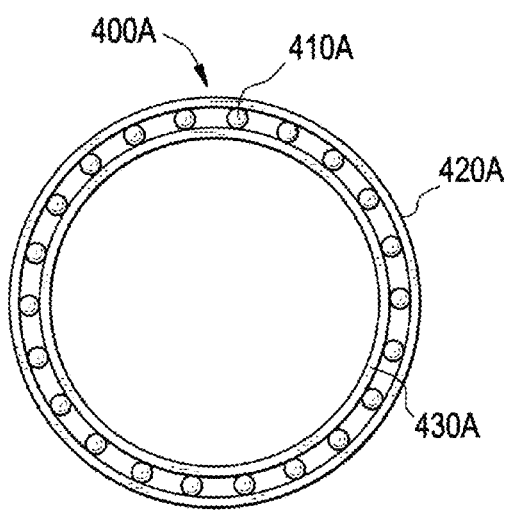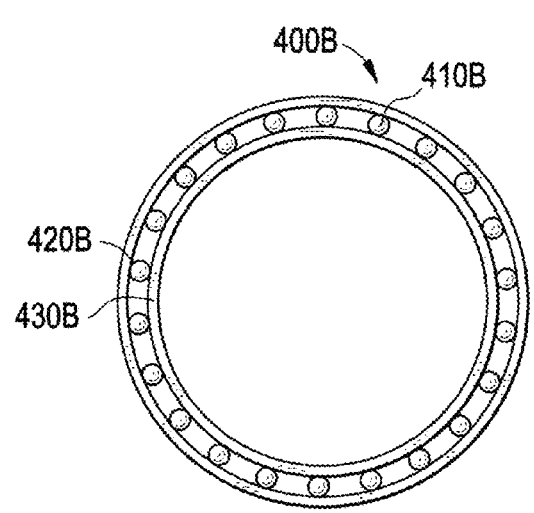

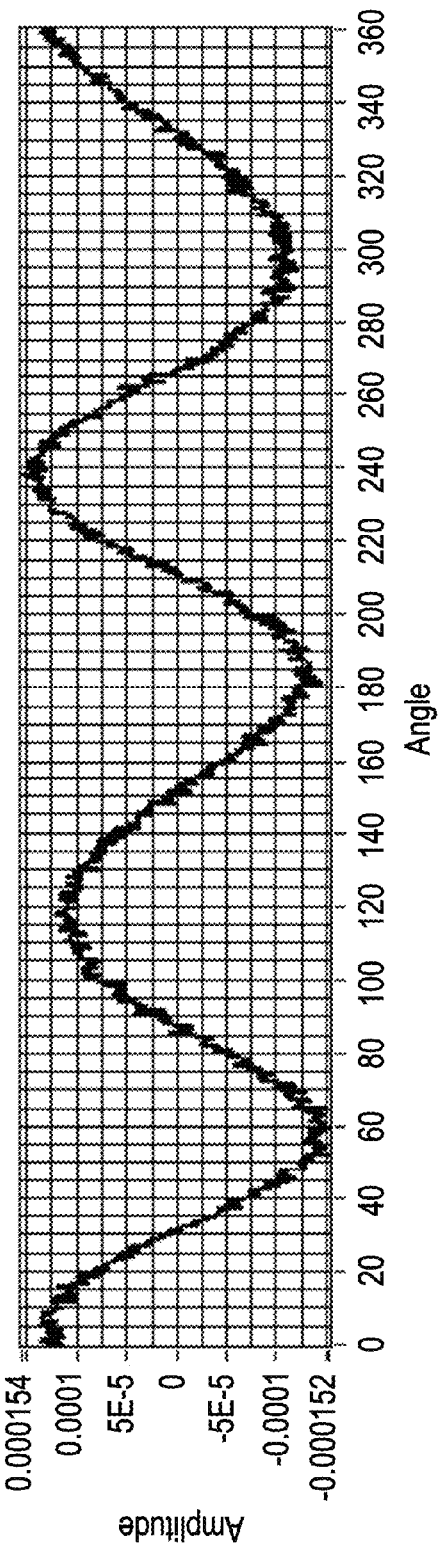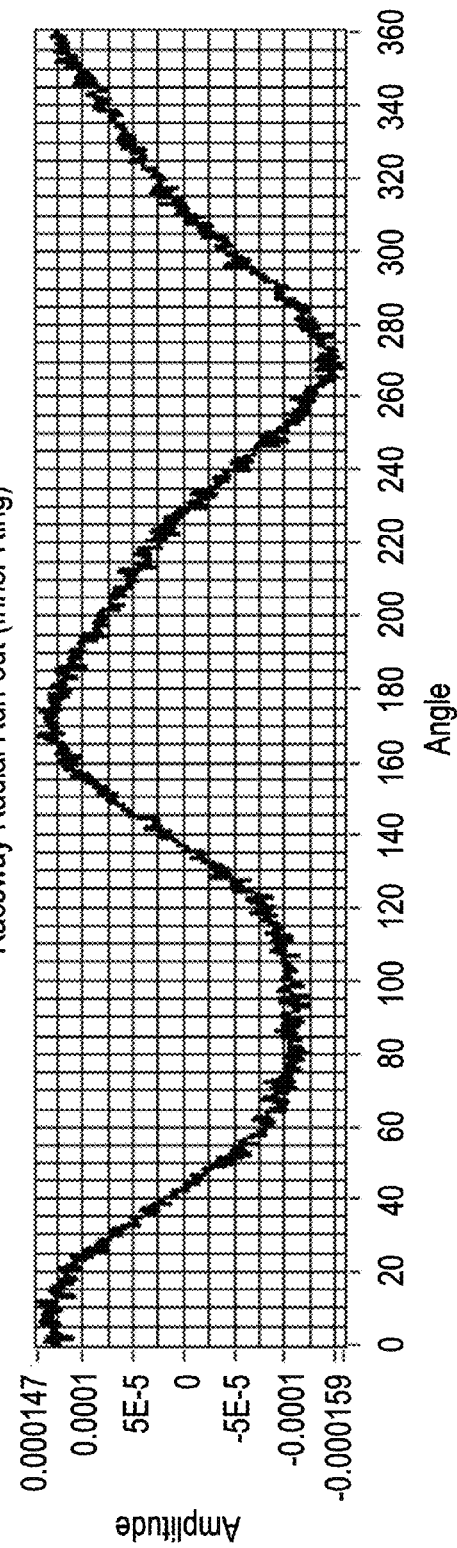

Radial Run-out (at an Axis)

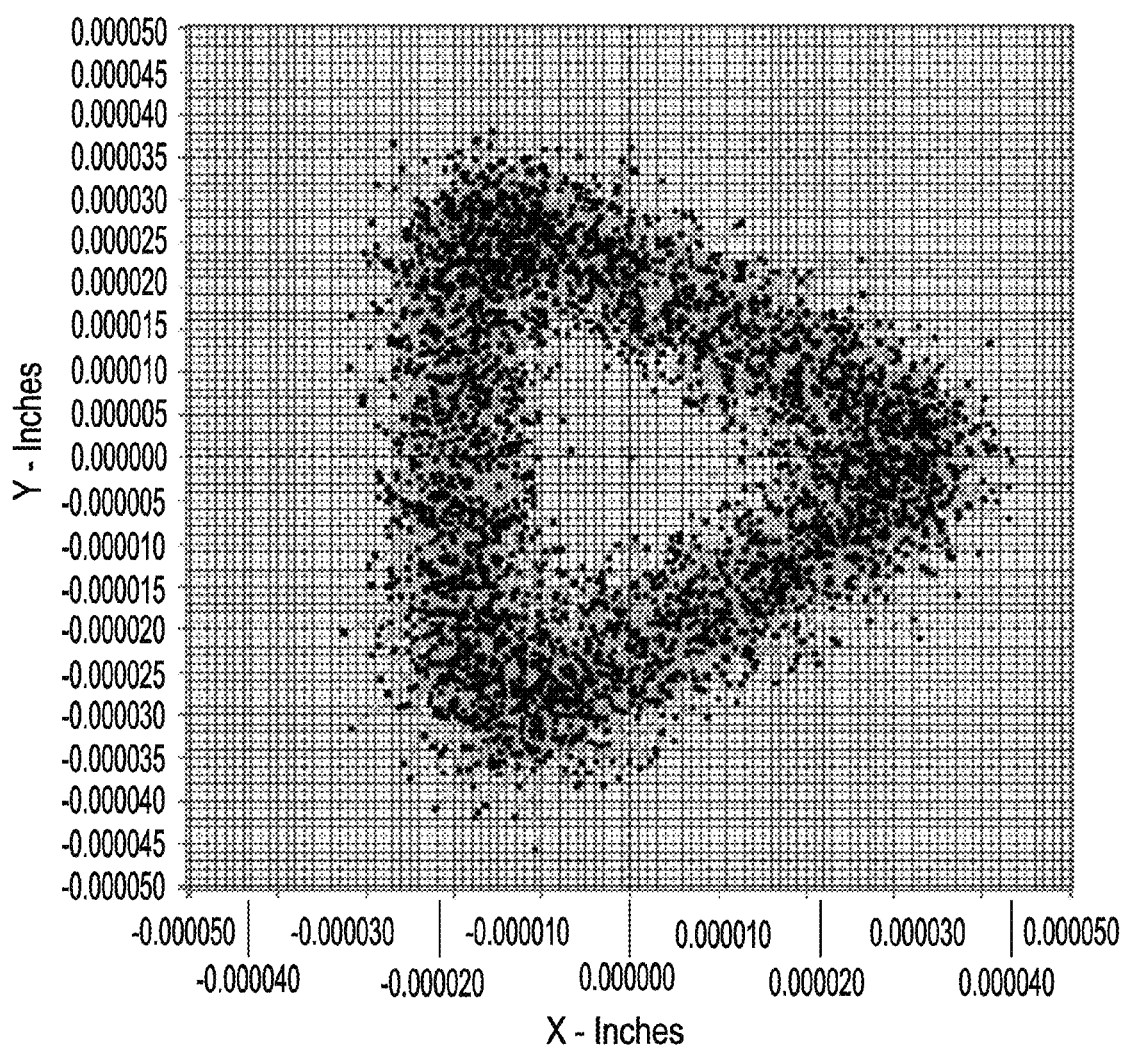

FIG. 13A

| RADIAL RUNOUTS INCHES | .0003 I/R | .0003 O/R |
|---|---|---|

FIG. 13B

| REPEATABLE RADIAL RUNOUTS INCHES | .0000759 X-AXIS | .0000838 Y-AXIS |
|---|---|---|

FIG. 13C

| NON-REPEATABLE RADIAL RUNOUTS INCHES | .0000241 X-AXIS | .0000328 Y-AXIS |
|---|---|---|

FIG. 13D

| RACEWAY WAVINESS IN ANY 30° ARC SEGMENT | 60 μ INCHES |
|---|---|
| RACEWAY WAVINESS IN ANY 15° ARC SEGMENT | 50 μ INCHES |

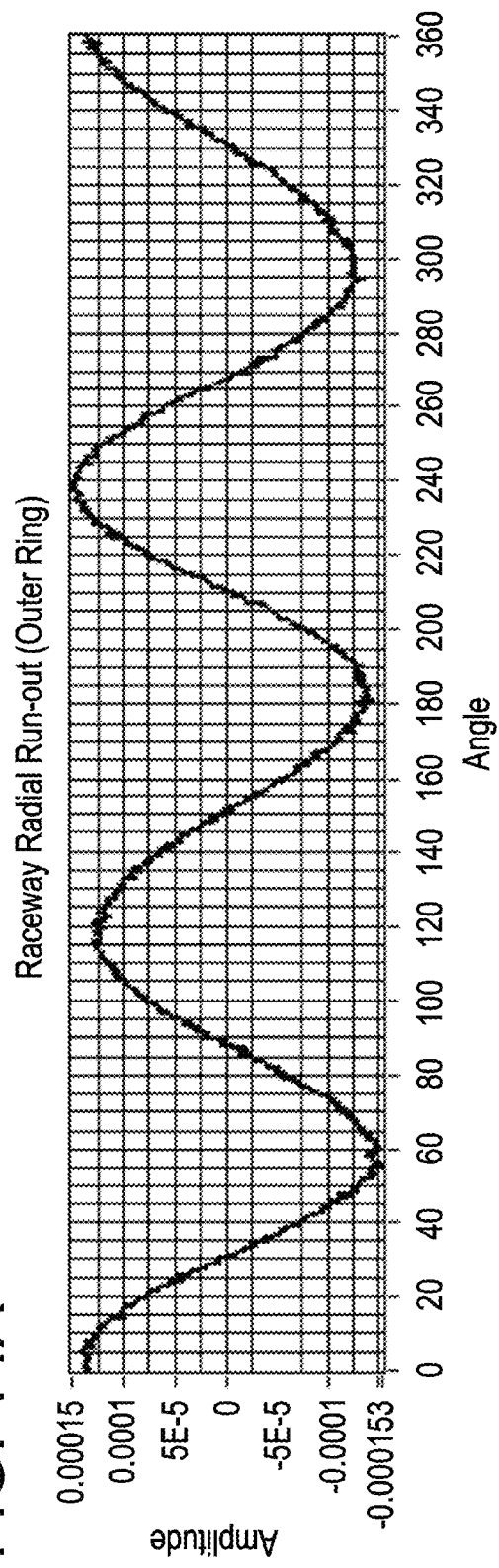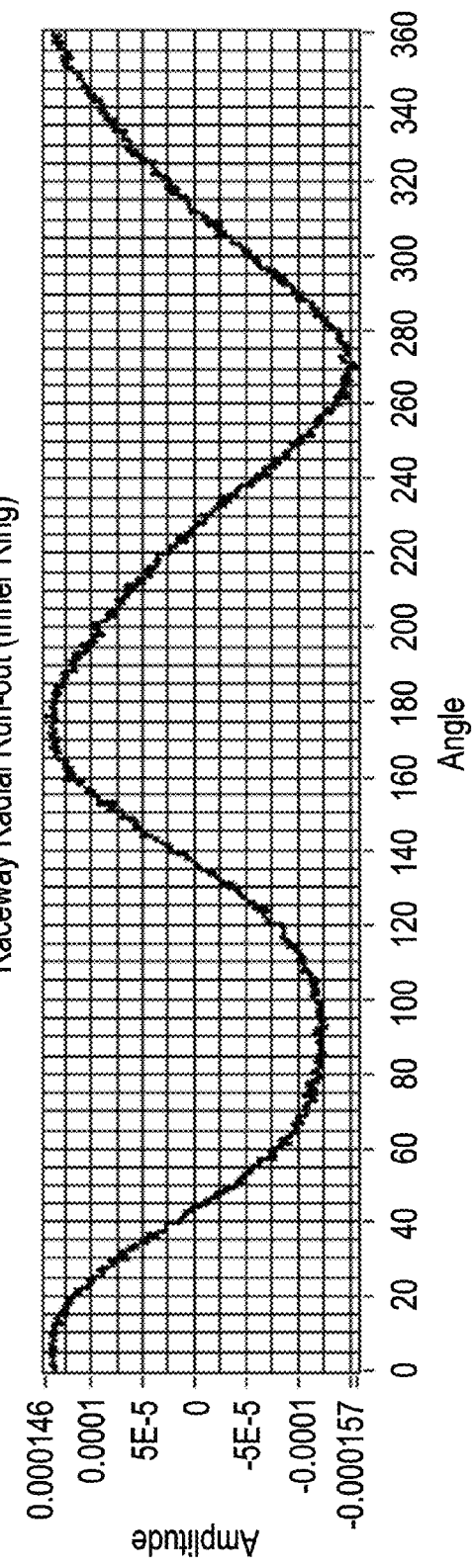

Radial Runout (at an Axis)

Inner Ring Centroid Radial Run-out Scatter Plot

FIG. 16A

| RADIAL RUNOUTS INCHES | .0003 I/R | .0003 O/R |
|---|---|---|

FIG. 16B

| REPEATABLE RADIAL RUNOUTS INCHES | .0000724 X-AXIS | .0000785 Y-AXIS |
|---|---|---|

FIG. 16C

| NON-REPEATABLE RADIAL RUNOUTS INCHES | .0000182 X-AXIS | .0000169 Y-AXIS |
|---|---|---|

FIG. 16D

| RACEWAY WAVINESS IN ANY 30° ARC SEGMENT | 40 µ INCHES |
|---|---|
| RACEWAY WAVINESS IN ANY 15° ARC SEGMENT | 30 µ INCHES |

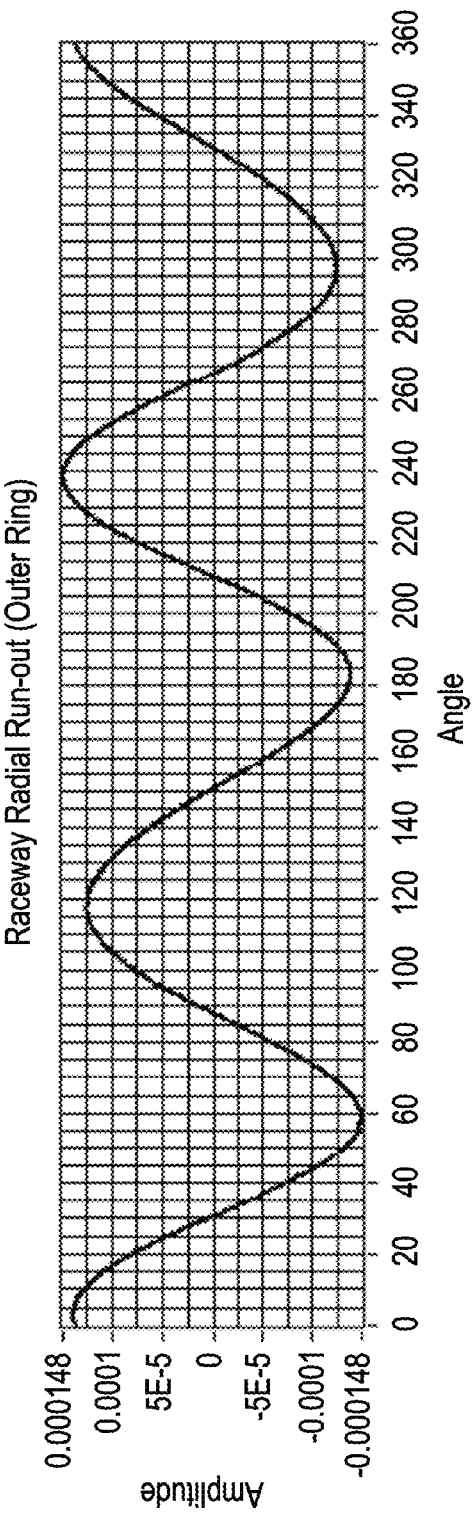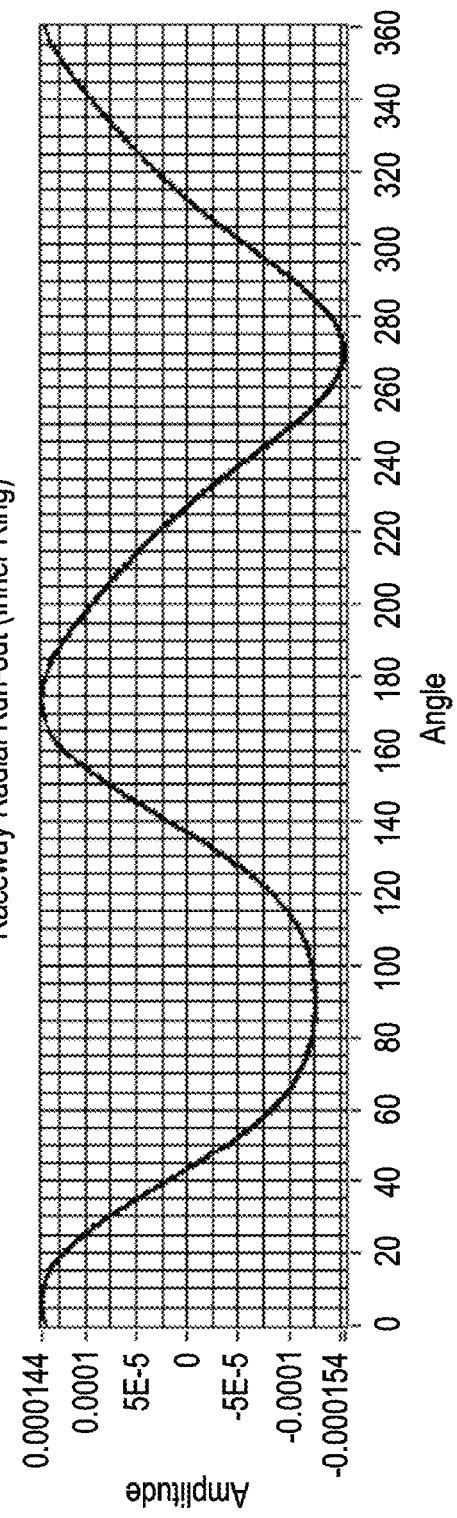

Radial Runout (at an Axis)

Inner Ring Centroid Radial Run-out Scatter Plot

FIG. 19A
| RADIAL RUNOUTS INCHES | .0003 I/R  | .0003 O/R  |
FIG. 19B
| REPEATABLE RADIAL RUNOUTS INCHES | .0000714 X-AXIS  | .0000776 Y-AXIS 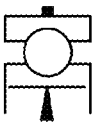 |
FIG. 19C
| NON-REPEATABLE RADIAL RUNOUTS INCHES | .0000126 X-AXIS 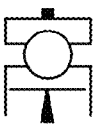 | .0000124 Y-AXIS 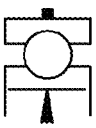 |
FIG. 19D
| RACEWAY WAVINESS IN ANY 30° ARC SEGMENT | 30 µ INCHES |
| RACEWAY WAVINESS IN ANY 15° ARC SEGMENT | 15 µ INCHES |

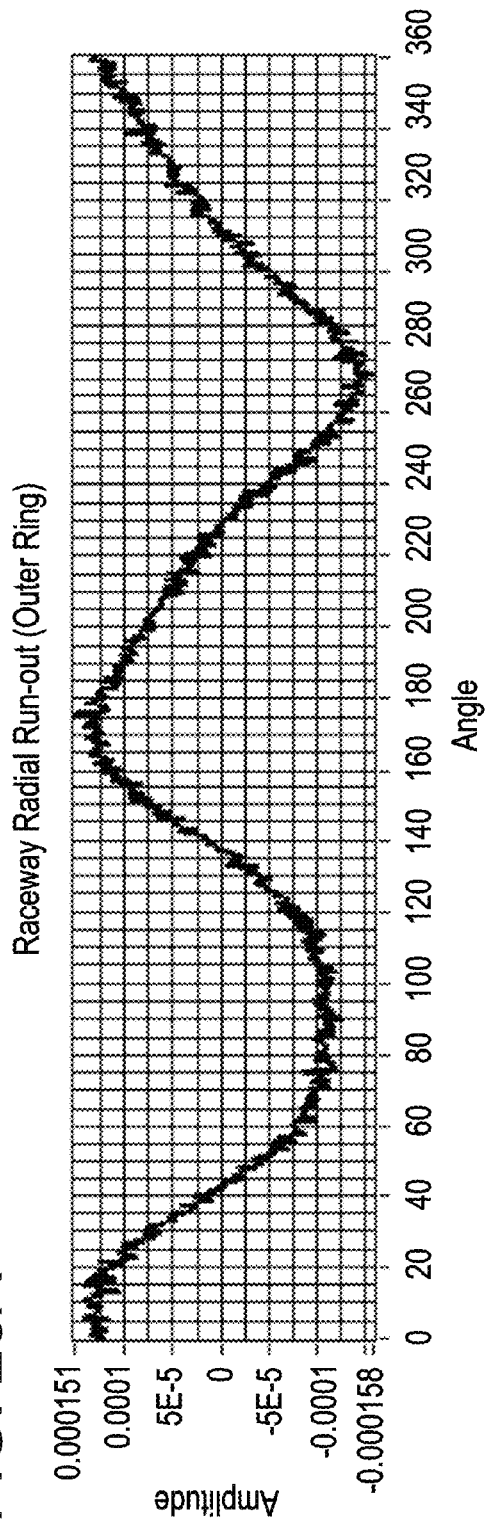
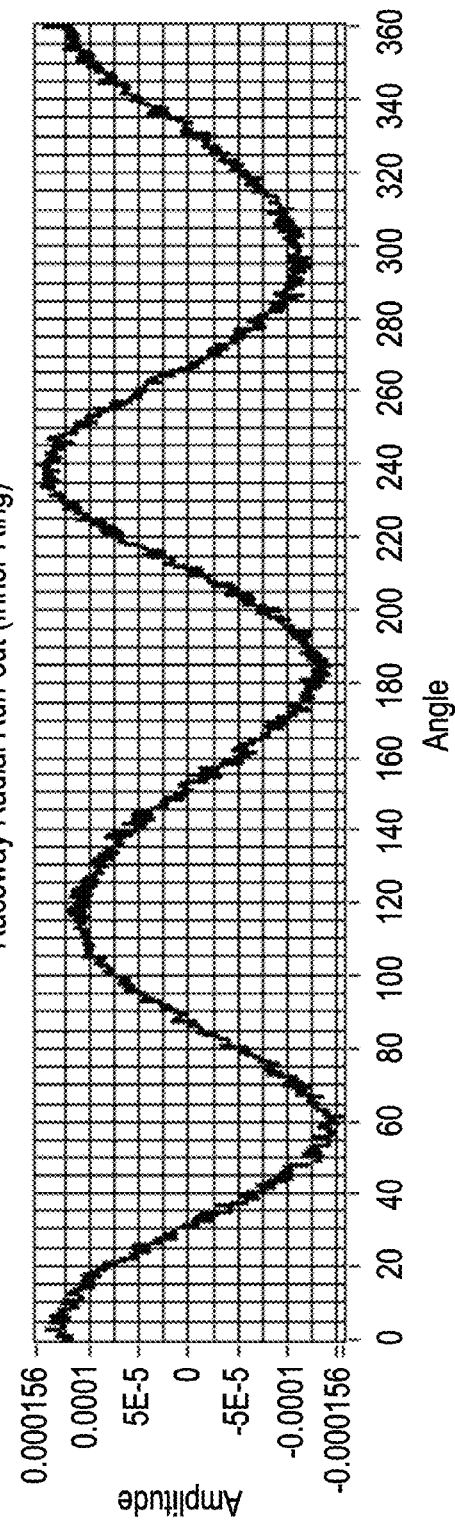

Radial Run-out (at an Axis)

Inner Ring Centroid Radial Run-out Scatter Plot

FIG. 22A

| RADIAL RUNOUTS INCHES | .0003 I/R | .0003 O/R |
|---|---|---|

FIG. 22B

| REPEATABLE RADIAL RUNOUTS INCHES | .0000624 X-AXIS | .0000925 Y-AXIS |
|---|---|---|

FIG. 22C

| NON-REPEATABLE RADIAL RUNOUTS INCHES | .0000227 X-AXIS | .0000546 Y-AXIS |
|---|---|---|

FIG. 22D

| RACEWAY WAVINESS IN ANY 30° ARC SEGMENT | 60 µ INCHES |
|---|---|
| RACEWAY WAVINESS IN ANY 15° ARC SEGMENT | 50 µ INCHES |

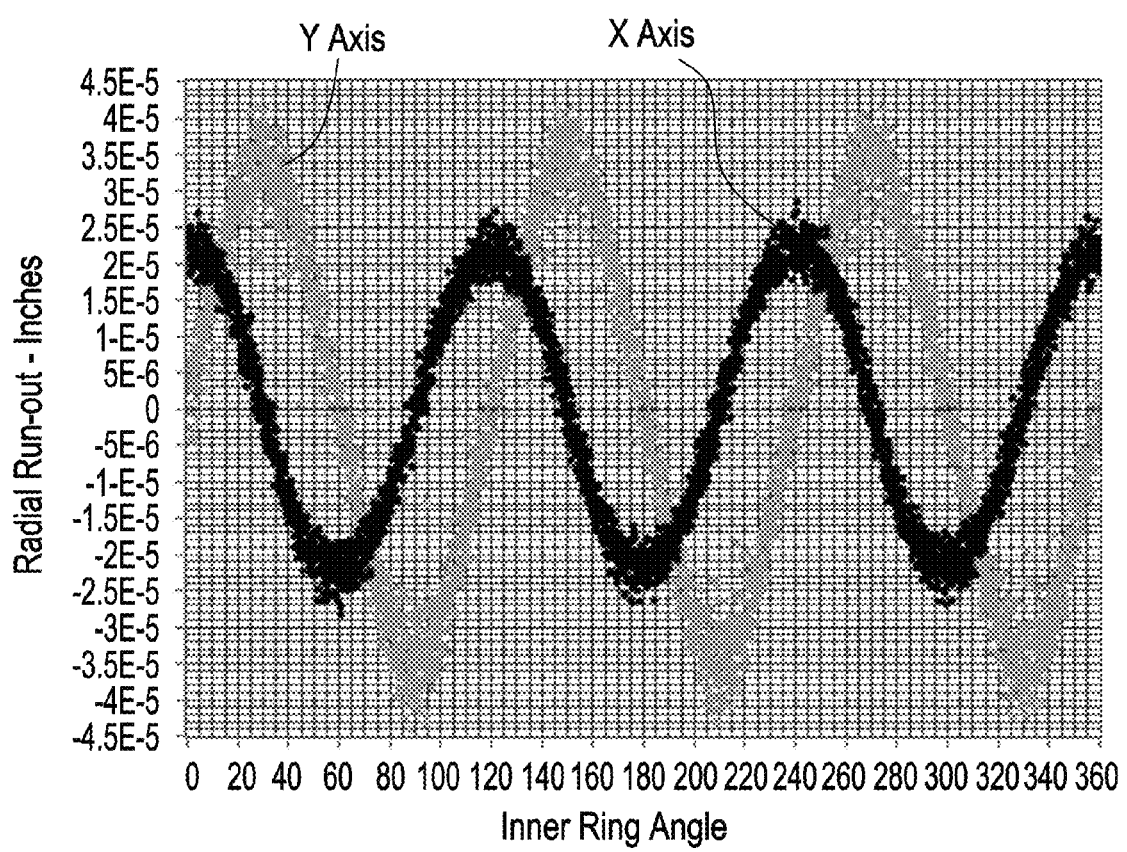

Inner Ring Centroid Radial Run-out Scatter Plot

FIG. 25A
| RADIAL RUNOUTS INCHES | .0003 I/R |  | .0003 O/R |  |
|---|---|---|---|---|
FIG. 25B
| REPEATABLE RADIAL RUNOUTS INCHES | .0000565 X-AXIS |  | .0000861 Y-AXIS | 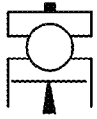 |
|---|---|---|---|---|
FIG. 25C
| NON-REPEATABLE RADIAL RUNOUTS INCHES | .0000105 X-AXIS |  | .0000301 Y-AXIS | 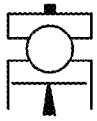 |
|---|---|---|---|---|
FIG. 25D
| RACEWAY WAVINESS IN ANY 30° ARC SEGMENT | 40 μ INCHES |
|---|---|
| RACEWAY WAVINESS IN ANY 15° ARC SEGMENT | 30 μ INCHES |

Radial Run-out (at an Axis)

Inner Ring Centroid Radial Run-out Scatter Plot

FIG. 28A

| RADIAL RUNOUTS INCHES | .0003 I/R | .0003 O/R |
|---|---|---|

FIG. 28B

| REPEATABLE RADIAL RUNOUTS INCHES | .0000553 X-AXIS | .0000878 Y-AXIS |
|---|---|---|

FIG. 28C

| NON-REPEATABLE RADIAL RUNOUTS INCHES | .0000091 X-AXIS | .0000285 Y-AXIS |
|---|---|---|

FIG. 28D

| RACEWAY WAVINESS IN ANY 30° ARC SEGMENT | 30 μ INCHES |
|---|---|
| RACEWAY WAVINESS IN ANY 15° ARC SEGMENT | 15 μ INCHES |

NON-RHYTHMICALLY SPACED ROLLING ELEMENTS FOR REDUCTION IN BEARING NON-REPEATABLE RUN-OUT

TECHNICAL FIELD

The present invention is directed to bearings and, more particularly, to rolling element bearings designed to meet low torque, high stiffness and corrosion resistant requirements in a combined load application.

BACKGROUND

A gimbal bearing assembly provides a pivoted support that allows for the rotation of an object about an axis. One embodiment of a gimbal bearing assembly includes the use of rolling element bearings, and more particularly a pair of angular contact ball bearings configured for use as a matched set. In general, each angular contact ball bearing includes an inner ring, an outer ring, and a plurality of rolling elements disposed between the inner ring and the outer ring. In many applications, the plurality of rolling elements is separated by a plurality of slug separators wherein typically a slug separator is positioned between a pair of rolling elements. Typically, the pair of angular contact ball bearings of a gimbal bearing assembly is configured such that there is no internal clearance in the bearings when properly mounted. Such a pair of angular contact ball bearings is commonly referred to as a "duplexed" pair of bearings and shall be referred to herein generally as a "duplex bearing." The gimbal bearing assembly may include more than one pair of angular contact ball bearings, that is, more than one duplex bearing. The duplex bearing provides accurate location of a shaft positioned at least partially therein and is designed to meet low torque, high stiffness and corrosion resistant requirements in a combined load application such as a gimbal bearing assembly.

The duplex bearing includes mounting or otherwise joining the pair of angular contact ball bearings to one another. There are three basic mounting methods to accommodate different loading requirements: Back-to-Back (referred to herein as a "B-Type" duplex bearing), Face-to-Face (referred to herein as an "F-Type" duplex bearing), and Tandem (referred to herein as a "T-Type" duplex bearing). Generally, B-Type and F-Type duplex bearings accommodate heavy radial loads, combined radial and thrust loads, reversing thrust loads and moment loads; while T-Type duplex bearings accommodate heavy radial loads and high one-direction thrust loads with minimum axial shaft deflection.

Axial shaft deflection is a measurement of the deviation of an axial reference surface, such as a surface of revolution or an exterior surface of a shaft, noted during one revolution of the shaft. Radial runout refers to a condition where a rotating component does not rotate in a true plane wherein the surface of a rotating component shifts in relation to its rotational axis. In particular, radial runout is a measurement of the variation in a direction perpendicular to the axis of rotation of an indicated surface, such as the exterior surface of the shaft, from a plane surface of revolution. Angular run out refers to a wobbling movement of the axis of rotation of the shaft and is a measurement of angle of the actual motion of the axis of rotation of the shaft. It has three orthogonal components commonly referred to as roll, pitch, and yaw; respectively, rotation about the X-axis (axis of rotation of the shaft), the Y-axis and the Z-axis. Waviness is a measurement of a broadly-spaced component of surface texture. Waviness is distinguished from flatness by its shorter spacing and its characteristic of being typically periodic in nature. In bearing applications, waviness of bearing races causes vibrations, noise and wear. The Annular Bearing Engineering Committee ("ABEC"), a division of the American Bearing Manufacturers Association ("ABMA"), has adopted an industry accepted standard for specifying the tolerances of a ball bearing. It is known as the ABEC scale and includes five classes from largest to smallest tolerances: 1, 3, 5, 7, and 9. For example, the tolerances of a ball bearing may be specified as ABEC-7T; wherein the "7T" identifies a precision class bearing in accordance with other standards adopted by the ABMA.

Standard rolling element bearings, and in particular duplex bearings, are fabricated such that there is a light axial pre-load induced on the bearing at nominal conditions. In some applications, increased bearing stiffness is provided by inducing a heavier axial load in the mounted bearing. Moreover, the axial load can be increased or decreased to meet the requirements of a particular application. However, typical rolling element bearings known in the art do not necessarily meet the requirements of a gimbal bearing application that has particularly stringent performance goals such as, for example, low starting and running torque, radial run-out and high stiffness characteristics.

SUMMARY

In one aspect, the present invention resides in a rolling element bearing that includes an outer member having an outer member interior surface and an outer member exterior surface. The bearing includes an inner member having an inner member interior surface and an inner member exterior surface and a plurality of rolling elements disposed between the inner member and the outer member. The bearing includes a plurality of random-length slug separators. The separators are of a first length, a second length or a third length, which are not equal. One of the plurality of random-length slug separators is disposed adjacent to at least one of the plurality of rolling elements. The plurality of rolling elements are non-rhythmically spaced apart.

In another aspect, the present invention resides in a gimbal bearing assembly comprising: a first rolling element bearing; a second rolling element bearing; and a shaft extending between the first rolling element bearing and the second rolling element bearing. Each of the first rolling element bearing and the second rolling element bearing respectively comprises an outer member having an outer member interior surface and an outer member exterior surface, the outer member interior surface defining a first outer race and a second outer race; an inner member having an inner member interior surface and an inner member exterior surface, the inner member exterior surface defining a first inner race and a second inner race, the inner member received in the outer member such that the inner member and the outer member share a common central axis; a first plurality of rolling elements disposed between the first inner race and the first outer race; a second plurality of rolling elements disposed between the second inner race and the second outer race; a first plurality of random-length slug separators wherein at least one of the first plurality of random-length slug separators is disposed adjacent to at least one of the first plurality of rolling elements, and wherein the at least one of the first plurality of random-length slug separators defines a different length than another of the first plurality of random-length slug separators; and a second plurality of random-length slug separators wherein at least one of the second plurality of random-length slug separators is disposed adjacent to at least one of the second plurality of rolling elements, and wherein the at least one of the second plurality of random-length slug separators defines a different length than another of the second plurality of random-length slug separators.

BRIEF DESCRIPTION OF THE DRAWINGS

FIG. 3A provides a cross-sectional side view of a gimbal bearing assembly in accordance with the present invention having two rolling element bearings.

FIG. 3B provides a cross-sectional side view of the gimbal bearing assembly shown in FIG. 3 showing run-out.

FIG. 4 is a table providing data relating to a waviness, a non-repeatable radial run-out and a system non-repeatable angular run-out for the gimbal bearing assembly shown in FIG. 3A.

FIG. 8A provides a graphical representation of a Cartesian array of a rolling element bearing in accordance with the present invention having a rhythmically spaced rolling element array.

FIG. 8B provides a graphical representation of a Cartesian array of a rolling element bearing in accordance with the present invention having a non-rhythmically spaced rolling element array.

FIG. 11A provides a graphical representation of a set of data results obtained from a comparison computation of an amplitude of a non-repeatable radial run-out of one embodiment of an outer ring of a rolling element bearing in accordance with the present invention.

FIG. 11B provides a graphical representation of a set of data results obtained from a comparison computation of an amplitude of a non-repeatable radial run-out of one embodiment of an inner ring of the rolling element bearing of FIG. 11A.

FIG. 12B provides a run-out scatter plot of a set of data results obtained from a comparison computation of non-repeatable central radial run-out of the inner ring of the rolling element bearing of FIG. 11A.

FIGS. 13A-13D provide a summary of the data results shown in FIGS. 11A, 11B, 12A and 12B.

FIG. 14A provides a graphical representation of a set of data results obtained from a comparison computation of an amplitude of a non-repeatable radial run-out of another embodiment of an outer ring of a rolling element bearing in accordance with the present invention.

FIG. 14B provides a graphical representation of a set of data results obtained from a comparison computation of an amplitude of a non-repeatable radial run-out of one embodiment of an inner ring of the rolling element bearing of FIG. 14A.

FIGS. 16A-16D provide a summary of the data results shown in FIGS. 14A, 14B, 15A and 15B.

FIG. 17A provides a graphical representation of a set of data results obtained from a comparison computation of an amplitude of a non-repeatable radial run-out of yet another embodiment of an outer ring of a rolling element bearing in accordance with the present invention.

FIG. 17B provides a graphical representation of a set of data results obtained from a comparison computation of an amplitude of a non-repeatable radial run-out of one embodiment of an inner ring of the rolling element bearing of FIG. 17A.

FIGS. 19A-19D provide a summary of the data results shown in FIGS. 17A, 17B, 18A and 18B.

FIG. 20A provides a graphical representation of a set of data results obtained from a comparison computation of an amplitude of a non-repeatable radial run-out of yet another embodiment of an outer ring of a rolling element bearing in accordance with the present invention.

FIG. 20B provides a graphical representation of a set of data results obtained from a comparison computation of an amplitude of a non-repeatable radial run-out of one embodiment of an inner ring of the rolling element bearing of FIG. 20A.

FIGS. 22A-22D provide a summary of the data results shown in FIGS. 20A, 20B, 21A and 21B.

FIG. 24A provides a run-out scatter plot of a set of data results obtained from a comparison computation of non-repeatable radial run-out at an axis of the inner ring of the rolling element bearing of FIG. 23A.

FIGS. 25A-25D provide a summary of the data results shown in FIGS. 23A, 23B, 24A and 24B.

FIGS. 28A-28D provide a summary of the data results shown in FIGS. 26A, 26B, 27A and 27B.

DESCRIPTION OF THE INVENTION

Figure 1A:
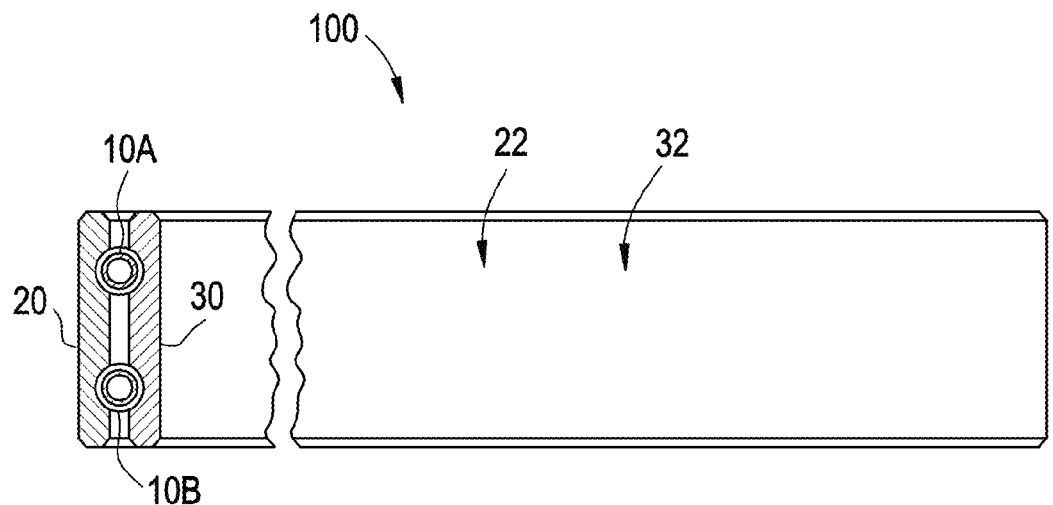
FIG. 1A provides a cross-sectional view of one embodiment of a rolling element bearing in accordance with the present invention.
Figure 1B:
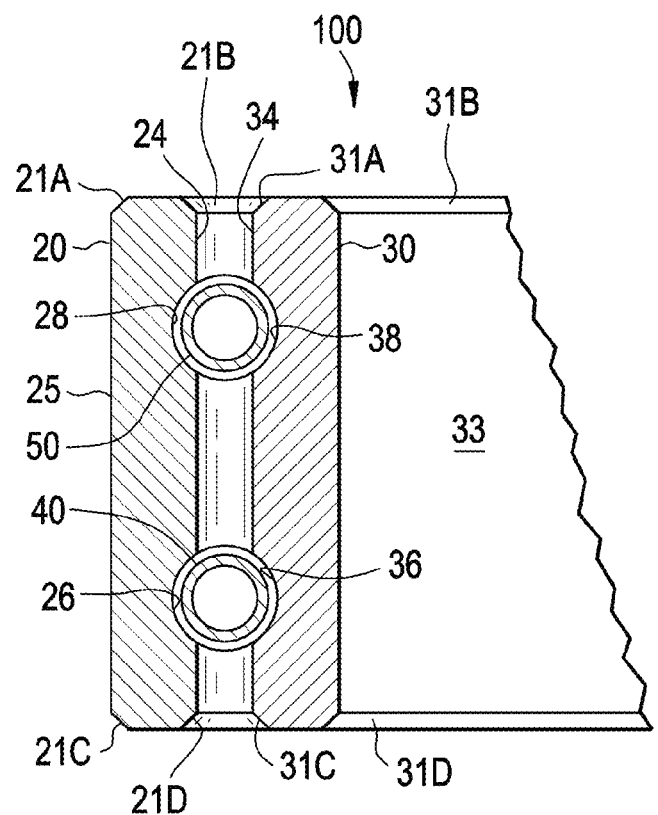
FIG. 1B provides a more detailed cross-sectional view of the rolling element bearing shown in FIG. 1A.

A gimbal bearing application having particularly stringent performance goals such as, for example, low starting and running torque, low repeatable and non-repeatable radial run-outs, and high stiffness characteristics includes a rolling element bearing assembly of the present invention, and more particularly a duplex bearing assembly as shown in FIGS. 1A and 1B, designated generally by the reference number 100 and hereinafter referred to as "duplex bearing 100." As described above, a typical duplex bearing includes mounting or otherwise joining a pair of angular contact ball bearings to one another. In contrast and as shown in FIG. 1A, duplex bearing 100 is a "full cartridge" duplex bearing comprising a duplex pair of rolling elements 10A and 10B, a one-piece outer member or ring 20 and a one-piece inner member ring 30. The outer ring 20 and the inner ring 30 are both generally annular and share the common central axis (not shown). The inner ring 30 has an annular configuration and defines a bore or a central aperture 32 for receiving a shaft or like member therein (not shown).

As further shown in FIGS. 1A and 1B, duplex bearing 100 includes the outer ring 20 and the inner ring 30 disposed within the outer ring 20. The inner ring 30 has an interior surface 33 and an exterior surface 34 that defines a first inner race 36 and a second inner race 38. The outer ring 20 has an annular configuration and defines a bore or a central aperture 22 for receiving the inner ring 30. The outer ring 20 has an interior surface 24 and an exterior surface 25. The interior surface 24 defines a first outer race 26 and a second outer race 28. The duplex pair of rolling elements 10A and 10B respectively includes a first plurality of rolling elements 40 disposed between the first inner race 36 and the first outer race 26; and a second plurality of rolling elements 50 disposed between the second inner race 38 and the second outer race 28. One or more optional shields (not shown) may be machined integral to the bearing outer ring 20 that extend radially inwardly toward the inner ring 30 to provide shielding for each of the plurality of rolling elements 40 and 50. In the disclosed embodiment, each of the plurality of rolling elements 40 and 50 comprise spherical balls.

In one embodiment, each of the outer edges or corners 21A, 21B, 21C and 21D of the outer ring 20 exhibit a chamfer in the range of 0 degrees to 90 degrees, and more particularly in the range of 45 degrees. In one embodiment, each of the outer edges or corners 31A, 31B, 31C and 31D of the inner ring 30 exhibit a chamfer in the range of 0 degrees to 90 degrees, and more particularly in the range of 45 degrees.

The one-piece outer ring 20 and one-piece inner ring 30 having the duplex pair of the plurality of rolling elements 40 and 50 provide improved stiffness of the duplex bearing 100 and reduced distortion, and improved runout and parallelism. As a result, duplex bearing 100 provides superior accuracy and performance reliability, including improved alignment and ease of next level assemblies. The one-piece outer ring 20 and one-piece inner ring 30 ring configurations also allows for unique manufacturing processes to be implemented which are not possible for fabricating a simple duplex bearing comprising a pair of angular contact bearings. For example, the one-piece outer ring 20 and one-piece inner ring 30 ring configuration are concurrently fabricated by precision grinding both rings or raceways in the same operation, thus ensuring that both raceways have radial run-outs and waviness lobe patterns that are perfectly in phase with each other. This produces the best configuration possible for reduction of repeatable and non-repeatable run-outs.

The plurality of rolling elements 40 and 50 are made from any suitable material, such as metal or alloys. Suitable metals and alloys from which the rolling elements may be fabricated include, but are not limited to, stainless steels (e.g., 440C, A286, and the like), nickel-chromium-based superalloys (e.g., Inconel and the like), titanium, titanium alloys, silicon nitride, silicon carbide, zirconium, and the like. In one embodiment, the plurality of rolling elements 40 and 50 are fabricated from Silicon Nitride ($Si_3N_4$). Rolling elements fabricated from $Si_3N_4$ exhibit a much lower coefficient of friction versus steel balls thereby providing enhanced survivability under marginal lubrication. Rolling elements fabricated from $Si_3N_4$ further exhibit a higher modulus of elasticity, as much as 50% higher than steel balls, which provides substantially higher stiffness. Because rolling elements fabricated from $Si_3N_4$ exhibit a much higher Young's modulus and lower Poisson's ratio than that of 440C stainless steel, the rolling elements elastically deform much less which leads to an increase in bearing stiffness in all axes, as well as a reduction in torque due to a decrease in ball-to-race elastic deformation patch area. In one embodiment, the plurality of rolling elements 40 and 50 are fabricated from a grade 10C $Si_3N_4$ wherein grade 10 balls are spherical within 0.000010 inch. In comparison, a typical run-out of a standard bearing raceway is approximately ten-times coarser at 0.000100 inch.

The outer ring 20 and the inner ring 30 are made from any suitable material, such as metal or alloys. Suitable metals from which the inner and outer rings may be fabricated include, but are not limited to, stainless steels (e.g., 440C stainless steel), titanium, titanium alloys, and the like. The use of 440C stainless steel eliminates the need for a thin, dense chrome plating while providing corrosion resistance protection and maintaining the precision, tolerance and finish of the outer ring 20 and the inner ring 30.

Figure 2A:
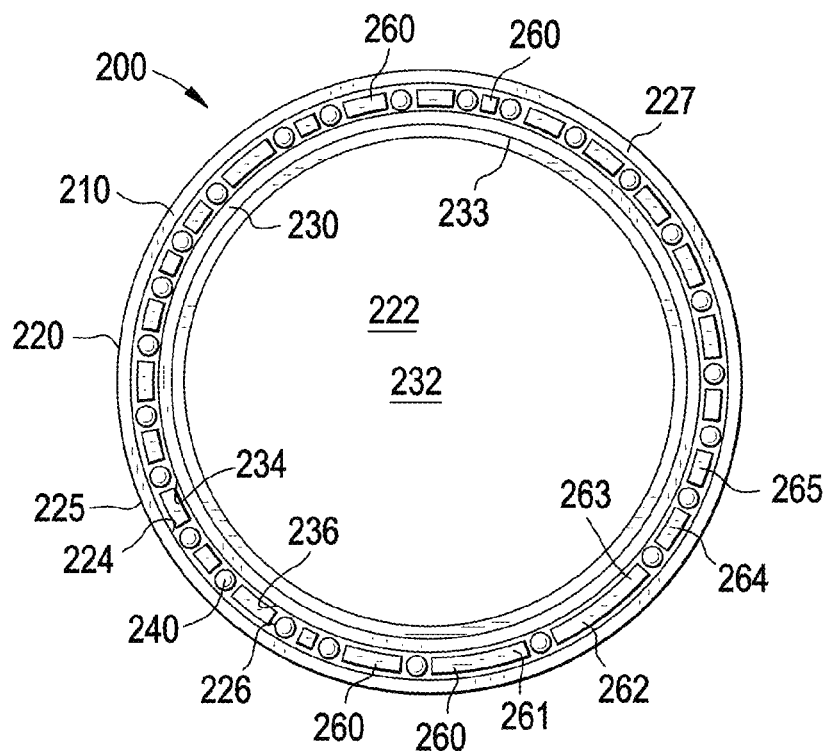
FIG. 2A provides a top plan view of another embodiment of a rolling element bearing in accordance with the present invention.

Another embodiment of a rolling element bearing assembly of the present invention, and more particularly a duplex bearing assembly, is shown in FIG. 2A, designated generally by the reference number 200 and is hereinafter referred to as "duplex bearing 200." Duplex bearing 200 also is a full cartridge duplex bearing comprising a duplex pair of rolling elements 210 (only one set of rolling elements is shown), a one-piece outer member or ring 220 and a one-piece inner member ring 230. The outer ring 220 and the inner ring 230 are both generally annular and share the common central axis (not shown). The inner ring 230 has an annular configuration and defines a bore or a central aperture 232 for receiving a shaft or like member therein (not shown).

As further shown in FIG. 2A, duplex bearing 200 includes the outer ring 220 and the inner ring 230 disposed within the outer ring 220. The inner ring 230 has an interior surface 233 and an exterior surface 234 that defines a first inner race 236 and a second inner race (not shown). The outer ring 220 has an annular configuration and defines a bore or a central aperture 222 for receiving the inner ring 230. The outer ring 220 has an interior surface 224 and an exterior surface 225. The interior surface 224 defines a first outer race 226 and a second outer race (not shown). The duplex pair of rolling elements 210 respectively includes a first plurality of rolling elements 240 disposed between the first inner race 236 and the first outer race 226; and a second plurality of rolling elements (not shown) disposed between the second inner race and the second outer race. In one embodiment, one or more optional shields 227 are machined integral to the bearing outer ring 220 that extend radially inwardly toward the inner ring 230 to provide shielding for each of the duplex pair of rolling elements 210. In the disclosed embodiment, each of the duplex pair of rolling elements 210 comprises spherical balls.

Duplex bearing 200 further comprises a first plurality of random-length slug separators 260 such that one of the random-length slug separators 260 is disposed adjacent to each of the plurality of rolling elements 240. As shown in FIGS. 2A and 2D, the first plurality of random-length slug separators 260 comprise random-length tubular slug separators such as for example, slug separators 261, 262, 263, 264 and 265. The slug separators 261 have a first length, the slug separators 262 have a second length, the slug separators 263 have a third length, the slug separators 264 have a fourth length and the slug separators 265 have a fifth length. The first, second, third, fourth and fifth lengths are of different magnitudes. When one of the random-length slug separators 261, 262, 263, 264 and 265 is disposed adjacent to each of the plurality of rolling elements 240, each of the plurality of rolling elements 240 is non-rhythmically spaced apart (i.e., randomly spaced) from another adjacent one of the plurality of rolling elements 240. In other words, one of the random-length slug separators 261, 262, 263, 264 and 265 is disposed between each adjacent pair of the plurality of rolling elements 240. In one embodiment of the duplex bearing 200, a second plurality of random-length slug separators is disposed between each adjacent pair of the second plurality of rolling elements similar to that shown in FIGS. 2A and 2D disposed between the second inner race and the second outer race. The second plurality of random-length slug separators include the slug separators 261 that have the first length, the slug separators 262 have the second length, the slug separators 263 have the third length, the slug separators 264 have the fourth length and the slug separators 265 have the fifth length. The first, second, third, fourth and fifth lengths are of different magnitudes.

In one embodiment, the rolling elements 30 and 230 are spaced apart from one another by a first set of random distances defined by one of the first, second, third, fourth and fifth lengths. The rolling elements 40 and 240 are spaced apart from one another by a second set of random distances defined by one of the first, second, third, fourth and fifth lengths.

Figure 2B:
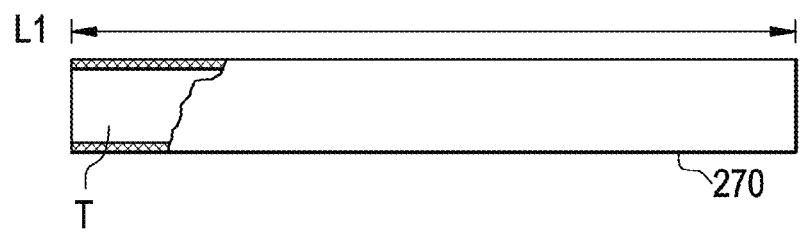
FIG. 2B provides a cross-sectional side view of a tube from which one or more slug separators are fabricated for installation in the rolling element bearing shown in FIG. 2A.
Figure 2C:
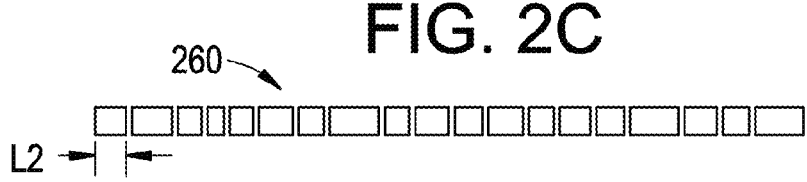
FIG. 2C provides a side view of random-length slug separators fabricated from the tube shown in FIG. 2B.
Figure 2D:
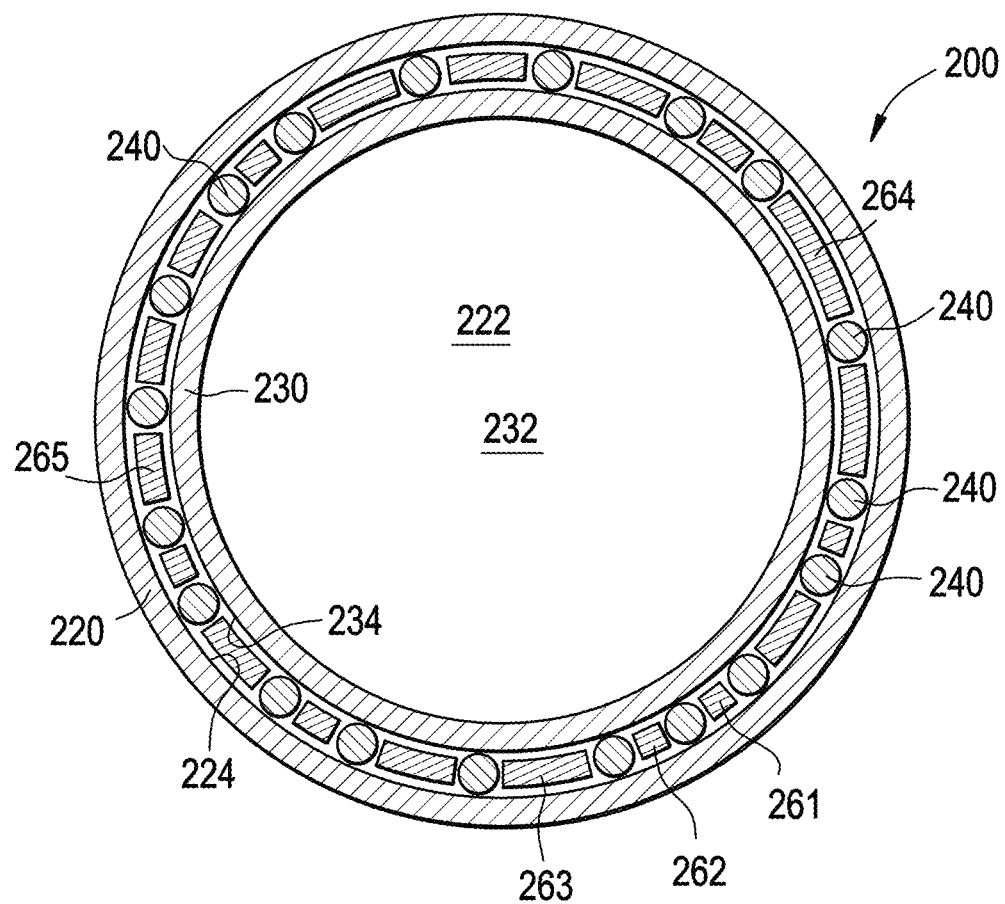
FIG. 2D is a cross sectional view of the rolling element bearing of FIG. 2A.

The plurality of slug ball separators 260 is fabricated from tubing stock 270 shown in FIG. 2B. Tubing stock 270 comprises an inner diameter and an outer diameter, the difference of which results in a tubing stock 270 wall thickness "T". In one embodiment, T is in the range of about 0.005 inch to about 0.020 inch, and more particularly in the range of about 0.009 inch to about 0.015 inch. Tubing stock 270 also comprises an overall length "L1". The tubing stock 270 is randomly cut to produce an "N" number of random-length slug separators 260 as shown in FIG. 2C, each of the N random-length slug separators 260 having an individual length "L2". In one embodiment, each individual length L2 measures within a calculated average length equal to L1/N. By staggering the length L2 of the slug separators 260, the non-rhythmic spacing of the duplex pair of rolling elements 210 can be achieved. Such non-rhythmic spacing impedes or prohibits the rolling element or ball complement spacing from synchronizing with the waviness lobe pattern. As a result, the repeatable and non-repeatable angular run-out of the full cartridge duplex bearing is reduced.

The tubing stock 270, and therefore slug separators 260, may be formed from a synthetic polymeric material. In one embodiment, the tubing stock 270, and therefore slug separators 260, are fabricated from polytetrafluoroethylene ("PTFE"). In another embodiment, the tubing stock 270 and slug separators 260 are fabricated from perfluoroalkoxy ("PFA").

A gimbal bearing assembly of the present invention, shown in FIGS. 3A and 3B, designated generally by the reference number 300 and hereinafter referred to as "gimbal bearing assembly 300." Gimbal bearing assembly 300 includes a first rolling element bearing or a first duplex bearing 300A and a second rolling element bearing or a second duplex bearing 300B that each in turn comprises a full cartridge duplex bearing as described above with reference to FIG. 2A and duplex bearing 200. First and second duplex bearings 300A and 300B each comprise a duplex pair of rolling elements 310A and 310B, a one-piece outer member or ring 320 and a one-piece inner member ring 330. The outer ring 320 and the inner ring 330 are both generally annular and share a common central axis A1. The inner ring 330 has an annular configuration and defines a bore or a central aperture 332 for receiving a shaft 370 or like member therein.

An illustration is provided in FIG. 3B of radial runout of the shaft 370 installed in the duplex bearings 300A and 300B is shown as the deviation of the central axis A1 to a position of the central axis indicated as A2. An angular runout of the shaft 370 is indicated by an angle "a". Measurements of waviness, non-repeatable radial run-out and system non-repeatable angular run-out were obtained along 15-degree arc segments and 30-degree arc segments. The following analysis conveys the impact that raceway waviness has on bearing non-repeatable radial run-out and considers all other variables to be constant. The non-repeatable radial run-out results can be implemented in a system-level non-repeatable angular runout calculation to determine the impact these radial run-outs have on system accuracy. A variety of performance characteristics of a duplex bearing of the present invention were obtained and calculated as presented in FIGS. 5-28. The comparative run-out is illustrated in FIG. 3B the results are tabulated in FIG. 4. However, bearing repeatable and non-repeatable radial run out is a function of a plethora of variables and as such it is not possible to calculate exact as-delivered values for a given bearing design. The results tabulated in FIG. 4 show a best case of non-repeatable radial run-out in the range of 55μ inch (1μ inch=0.000001 inch; or 1 millionth of an inch); and a system non-repeatable angular run-out in the range of a 3.75 arc segment. A waviness of a 30 degree arc segment was obtained in the range of 60μ inch; and of a 15 degree arc segment in the range of 50μ inch.

Figure 5:
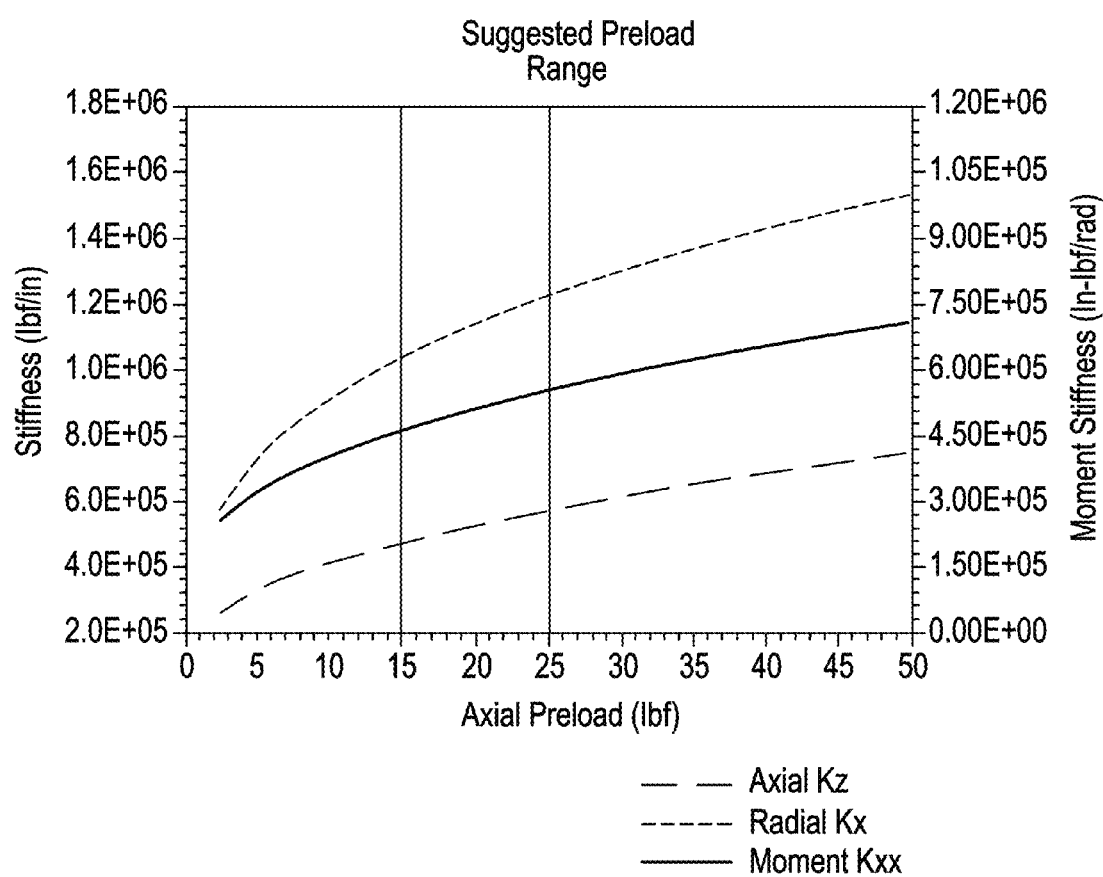
FIG. 5 provides a graphical representation of a stiffness characteristic of the rolling element bearing shown in FIG. 3A as a function of axial preload.

In one embodiment, the rolling element bearing should exhibit a stiffness characteristic in the range of 200,000 lbf/in in the axial direction and in the range of 1,000,000 lbf/in in the radial direction. FIG. 5 provides a graphical representation of a stiffness characteristic of the rolling element bearing as a function of axial preload which indicates that such rolling element bearings meet and exceed these requirements when axially preloaded to 20±5 lbf. In particular, FIG. 5 shows that when axially preloaded to 20 lbf, the rolling element bearing exhibits a stiffness characteristic of approximately 520,000 lbf/in in the axial direction and approximately 1,140,000 lbf/in in the radial direction. Bearing stiffness and torque have a codependent relationship. To ensure that bearing torque is as low as possible for this particular embodiment, a bearing preload range at its lower end, such as slightly above 15 lbs, is advantageous.

Figure 6:
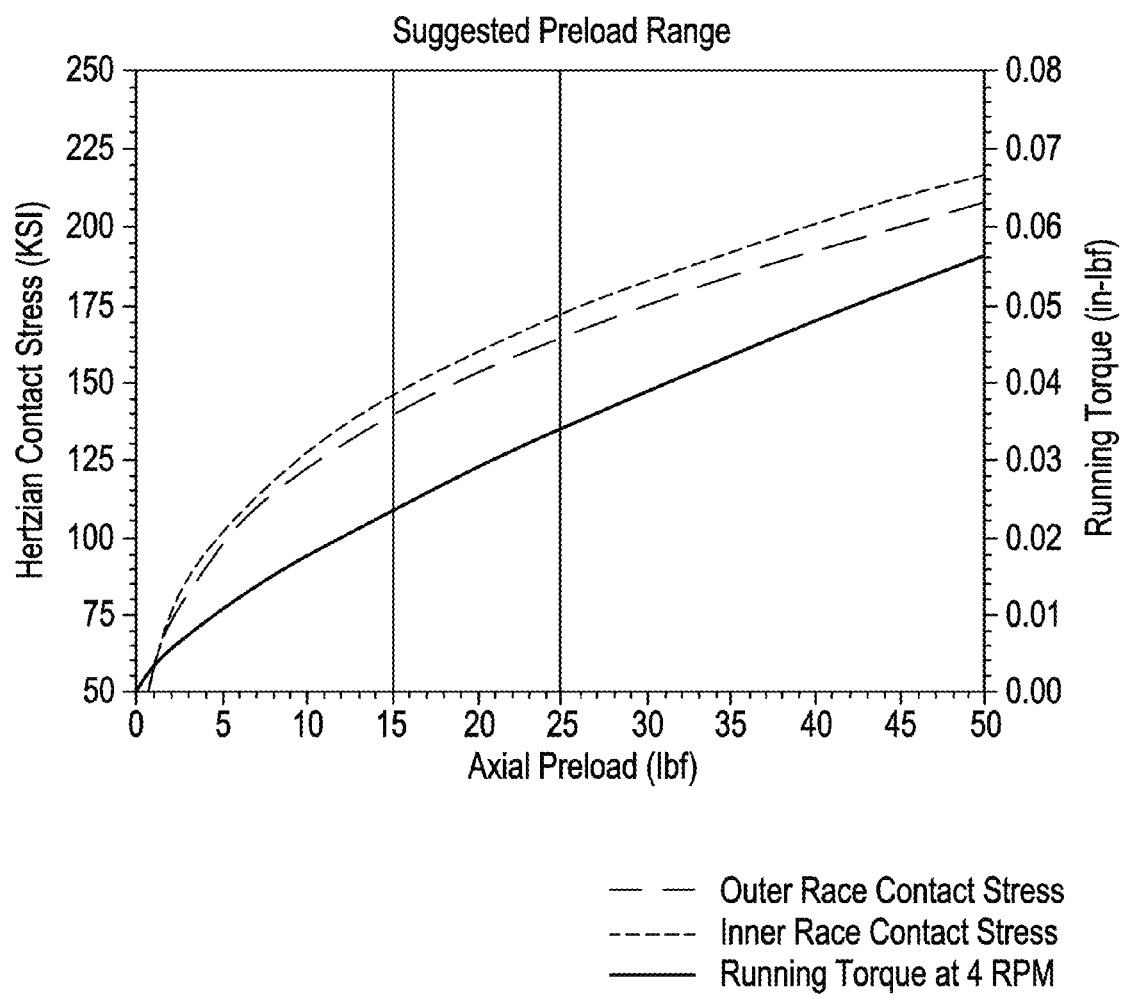
FIG. 6 provides a graphical representation of an effect of a contact stress on bearing running torque of the rolling element bearing shown in FIG. 3A.

FIG. 6 provides a graphical representation of an effect of a contact stress on bearing running torque of the rolling element bearing shown in FIG. 3A. The codependent relationship of bearing stiffness and torque is a result of the Hertzian contact stress distributions generated by axially preloading the rolling element bearing. The rolling element bearing was axially preload to 20±5 lbs. to convey the bearing running torque performance within this preload range. As the contact stress between the balls and raceways increases, the elements elastically deform and generate a higher bearing stiffness as well as a higher bearing running torque. This performance characteristic is illustrated in FIG. 6. In particular, FIG. 6 shows that when axially preloaded to 20 lbf, the outer race of the rolling element bearing exhibits a Hertzian contact stress of approximately 155 kilopounds per square inch ("KSI"); and the inner race of the rolling element bearing exhibits a Hertzian contact stress of approximately 160 KSI.

In one embodiment, the rolling element bearing should exhibit a starting torque per bearing in the range of 0.043 in-lbf (50 gm-cm) starting torque per bearing, and therefore a total starting torque in the range of 0.086 in-lbf (100 gm-cm) for the rolling element bearing. At a high end of axial preload in the range of 25 lbf, the rolling element bearing pair should exhibit at least 0.034 in-lbf of torque to run at 4 RPM. Starting torque can be typically assumed to be double the running torque at the max running speed. As a result, the rolling element bearing should exhibit, with 25 lbf axial preload, a starting torque of approximately 0.068 in-lbf (79 gm-cm).

The selection of an appropriate lubricant effects the calculations of the running torque exhibited by the rolling element bearing. Lubricants of varying kinematic viscosities, densities, and pressure to viscosity coefficients will produce dramatically different elasto-hydrodynamic film separation of the rolling elements and the raceway. This in turn produces a dramatically different running torque. The calculations performed and the results presented herein with obtained using a Brayco 815Z Micronic grade lubricant. This lubricant was selected for its predictable torque performance attributes.

Figure 7:
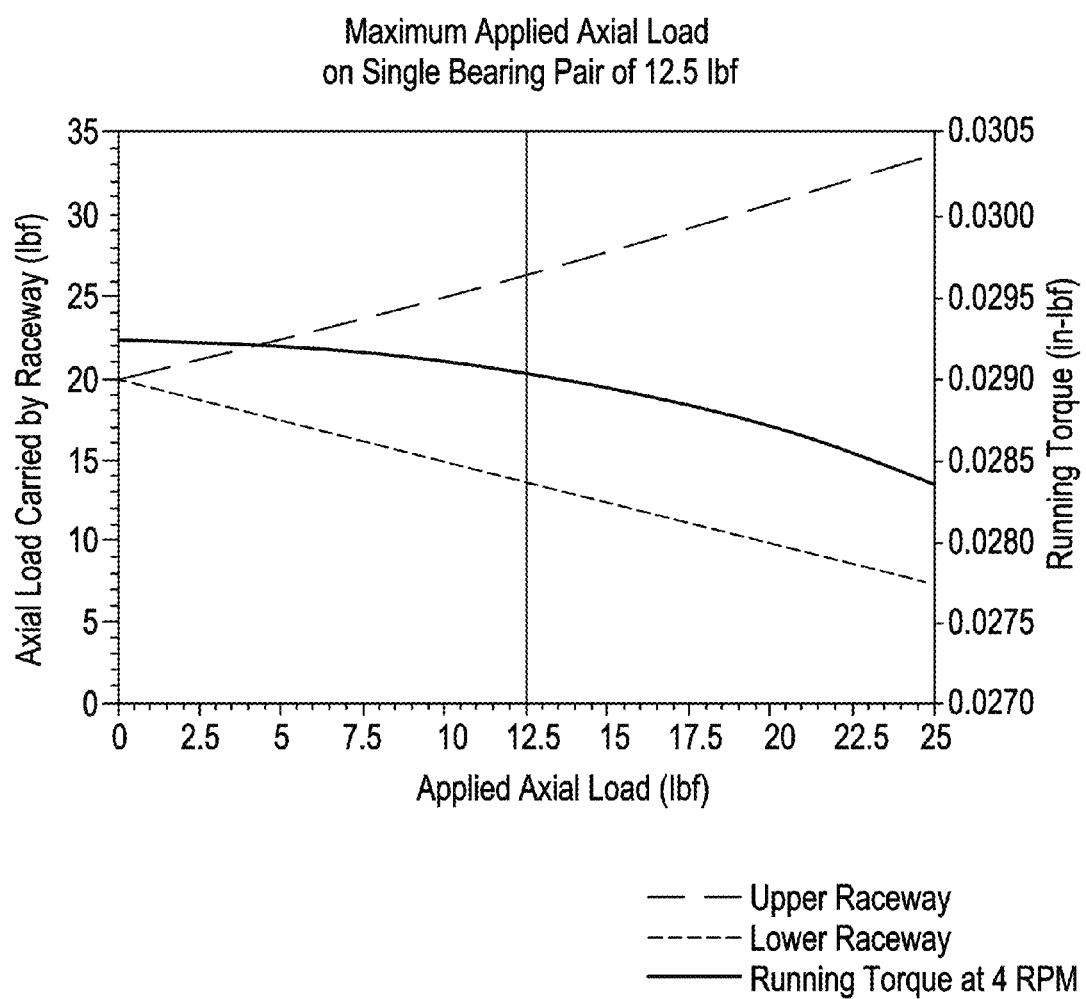
FIG. 7 provides a graphical representation of an effect of a carried axial load on bearing running torque of the rolling element bearing shown in FIG. 3A.

FIG. 7 provides a graphical representation of an effect of a carried axial load on bearing running torque of the rolling element bearing. The results demonstrate this mechanic for applied loads lesser then that of double the axial preload. This mechanic dramatically changes when loads greater than double the axial preload are applied. In particular, FIG. 7 shows that when axially preloaded to 12.5 lbf, the upper raceway carries an axial load of approximately 26.5 lbf; and the lower raceway carries an axial load of approximately 13.5 lbf. Axially preloaded rolling element bearing running torque slightly decreases as a function of applied axial load. This is due to the inverse codependent load sharing mechanics of a rolling element pair. The load carried by one raceway increases as the load carried by the other decreases. This in turn slightly changes the total running torque of the pair. The results depicted in FIG. 7 demonstrate this mechanic and how it affects the bearing performance during application.

The repeatable and non-repeatable radial run out of the rolling element bearing is a function of a plethora of variables. In the interest of comparative analysis, only one variable is changed at any given time to determine the weight that variable has in the overall performance mechanism. In the following analysis, the impact that raceway waviness has on bearing radial run-out is detailed. An often overlooked critical factor is the condition or precision of the support structure housing the bearing. In the following analysis, it is assumed that the support housing and shaft are perfectly round and rigid. Size and sphericity of the rolling elements are also assumed to be perfect. These assumptions are made to ensure that only the impact that waviness has on radial run-out is analyzed.

To gather a greater understanding of the effect waviness has on radial run-outs, bearing rolling elements and ring raceways are modeled as Cartesian arrays. FIG. 8A provides a graphical representation of a Cartesian array of a rolling element bearing or a duplex bearing 400A in accordance with the present invention; and FIG. 8B provides a graphical representation of a Cartesian array of a rolling element bearing or a duplex bearing 400B in accordance with the present invention. Each duplex bearing 400A and 400B comprises a full cartridge duplex bearing as described above with reference to FIG. 2A and duplex bearing 200. Duplex bearing 400A comprises a duplex pair of rolling elements 410A (only one set of rolling elements shown), a one-piece outer member or ring 420A, and a one-piece inner member ring 430A. Duplex bearing 400B comprises a duplex pair of rolling elements 410B (only one set of rolling elements shown), a one-piece outer member or ring 420B, and a one-piece inner member ring 430B. Duplex bearing 400A exhibits a rhythmically spaced rolling element 410A array; and duplex bearing 400B exhibits a non-rhythmically spaced rolling element 410B array. The rolling element arrays 410A, 410B are indexed about a rotational axis, the outer ring centroid, to model the outer ring raceway-to-rolling element tangential rolling contact mechanics. The inner ring raceway centroid location is then computed by a best fit algorithm of the inner ring raceway array to the rolling element arrays. The change in inner ring raceway centroid with respect to the outer ring raceway centroid presents a depiction of bearing repeatable radial run-out. This indexing continues so as to simulate multiple bearing revolutions, of which the non-repeatable radial run-out of the bearing can be depicted.

Figure 9:
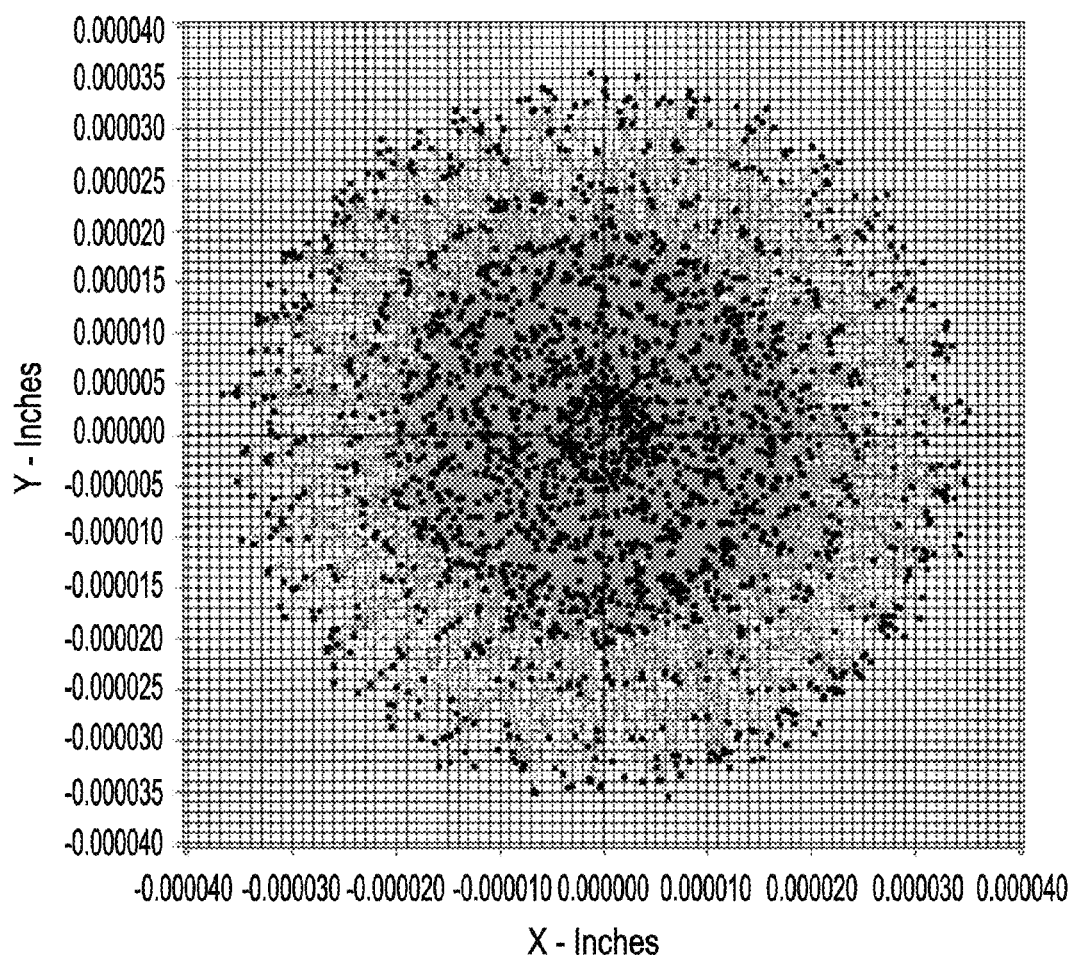
FIG. 9 provides a graphical representation of a set of data results obtained from an analysis of bearing non-repeatable radial run-out of the rolling element bearing of FIG. 8A having the rhythmically spaced rolling element array.

FIG. 9 provides a graphical representation of a set of data results obtained from an analysis of bearing non-repeatable radial run-out of the duplex bearing of FIG. 8A having the rhythmically spaced rolling element array. The data depicted in FIG. 9 represents the inner ring centroid radial movement relative to outer ring centroid. In cases where the rhythmic pattern comes into phase with the frequency of the waviness pattern, dramatic increases in bearing non-repeatable radial run-out is generated as is shown in FIG. 9. This effect is particularly troubling in bearing applications where extreme accuracy is required. Often times, at the system level, repeatable bearing run-out can be compensated through system software, but non-repeatable run-out cannot be compensated. This causes inaccuracy at the system level.

Figure 10:
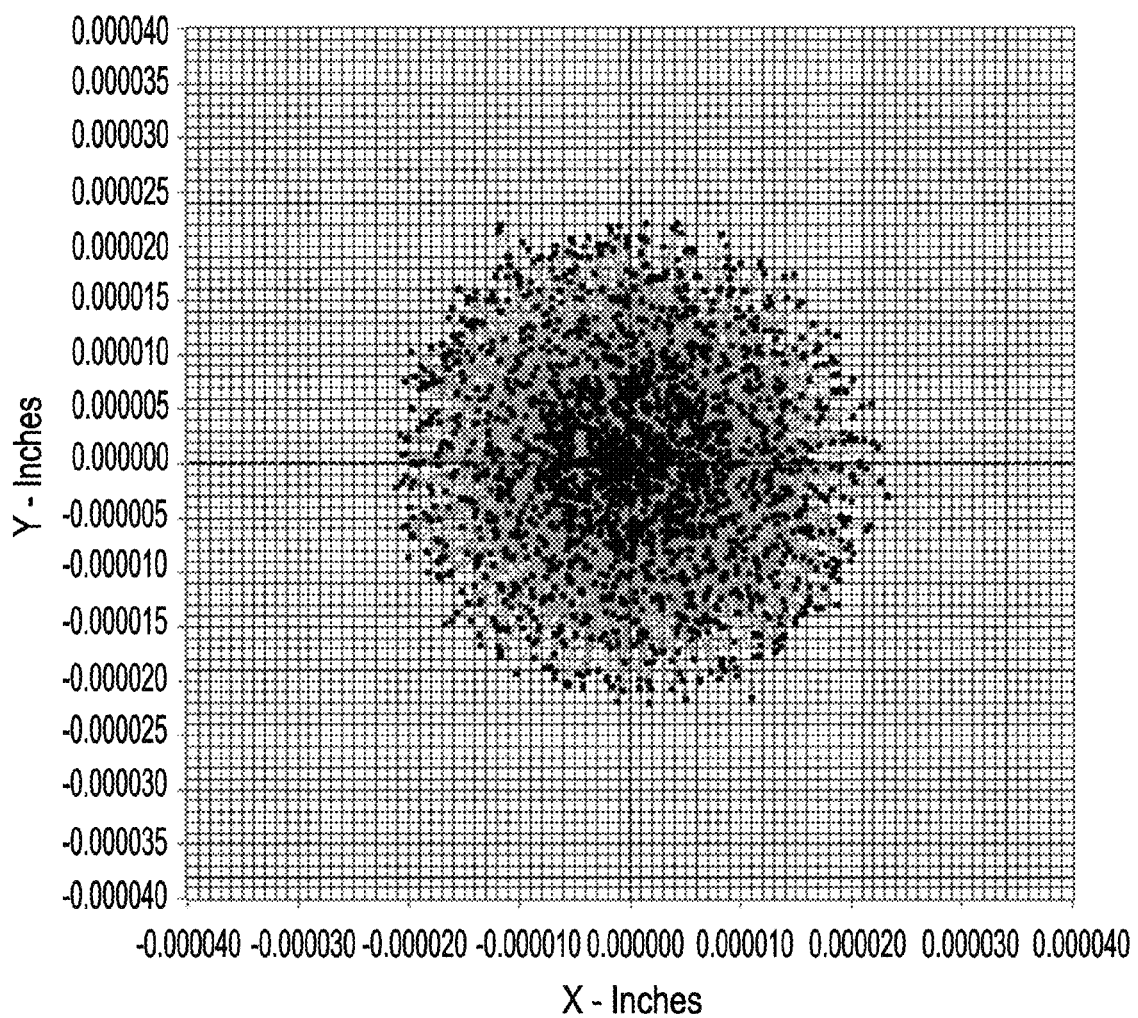
FIG. 10 provides a graphical representation of a set of data results obtained from an analysis of bearing non-repeatable radial run-out of the rolling element bearing of FIG. 8B having the non-rhythmically spaced rolling element array.

FIG. 10 provides a graphical representation of a set of data results obtained from running the same analysis of bearing non-repeatable radial run-out of the rolling element bearing of FIG. 8B having the non-rhythmically spaced rolling element array. All other variable where left the same as the previous analysis, particularly raceway waviness frequency and amplitude. The data depicted in FIG. 10 also represents the inner ring centroid radial movement relative to outer ring centroid. The analysis showed a dramatic reduction in bearing non-repeatable radial run-out, as seen in FIG. 10. When comparing the analyses depicted in FIGS. 9 and 10, a reduction in non-repeatable radial run-out of approximately 40% is obtained due to the non-rhythmic spacing of the rolling elements. Accordingly, when the bearing rolling elements are not allowed to come into phase with the frequency of the waviness pattern present in the raceways, the bearing non-repeatable radial run-out is dramatically reduced.

An analysis of repeatable and non-repeatable radial run-outs and raceway waviness was performed, the results are presented in FIGS. 11A-19D as described below, wherein a three-point out-of-roundness was observed on the outer ring and a two-point out-of-roundness was observed on the inner ring as further described herein.

An analysis of waviness tolerance was performed employing a low end of typical manufacturing standard deviation distribution. Typical manufacturing processes produce raceway waviness in the range of 150 to 50µ inches. Raceway waviness can vary greatly from ring to ring. For a best case scenario, comparison computations were performed with a maximum waviness of 50µ inches over any 15° arc segment. In the interest of creating a clearer graphic representation of non-repeatable radial run-out, both bearing raceway radial run-outs were set to 0.0003 inch total indictor reading. This is greater than the 0.0002 inch radial run-out specified by an ABEC-7T precision class, but provides a clearer representation of data in run-out scatter plots.

Figure 12A:
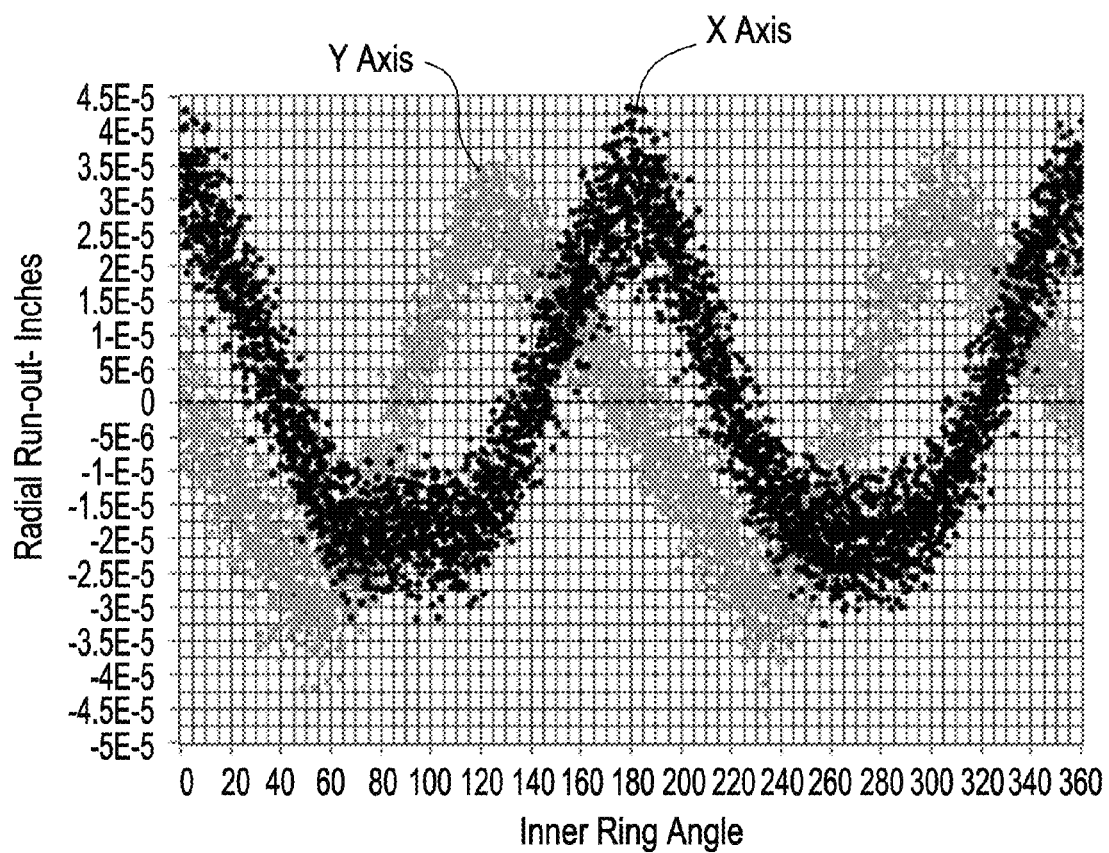
FIG. 12A provides a run-out scatter plot of a set of data results obtained from a comparison computation of non-repeatable radial run-out at an axis of the inner ring of the rolling element bearing of FIG. 11A.

FIG. 11A provides a graphical representation of a set of data results obtained from a comparison computation of an amplitude of a non-repeatable radial run-out of one embodiment of an outer ring of a rolling element bearing in accordance with the present invention. FIG. 11B provides a graphical representation of a set of data results obtained from a comparison computation of an amplitude of a non-repeatable radial run-out of one embodiment of an inner ring of the rolling element bearing of FIG. 11A. FIG. 12A provides a run-out scatter plot of a set of data results obtained from a comparison computation of non-repeatable radial run-out at an axis of the inner ring of the rolling element bearing of FIG. 11A. FIG. 12B provides a run-out scatter plot of a set of data results obtained from a comparison computation of non-repeatable central radial run-out of the inner ring of the rolling element bearing of FIG. 11A.

FIGS. 13A-13D provide a summary of the data results shown in FIGS. 11A, 11B, 12A and 12B. As shown in FIG. 13A, radial run-outs for both the inner ring and the outer ring are in the range of 0.0003 inch. As shown in FIG. 13B, a repeatable radial run-out along the X-axis is in the range of 76µ inch and along the Y-axis is in the range of 84µ inch. As shown in FIG. 13C, a non-repeatable radial run-out along the X-axis is in the range of 24µ inch and along the Y-axis is in the range of 33µ inch. As shown in FIG. 13D a raceway waviness in any 30 degree are segment is in the range of 60µ inch; and a raceway waviness in any 15 degree are segment is in the range of 50µ inch. It should be understood that the values expressed herein and in FIGS. 13A-13D are for relative comparison only and should not be assumed to be as-delivered bearing radial run-outs.

Figure 15A:
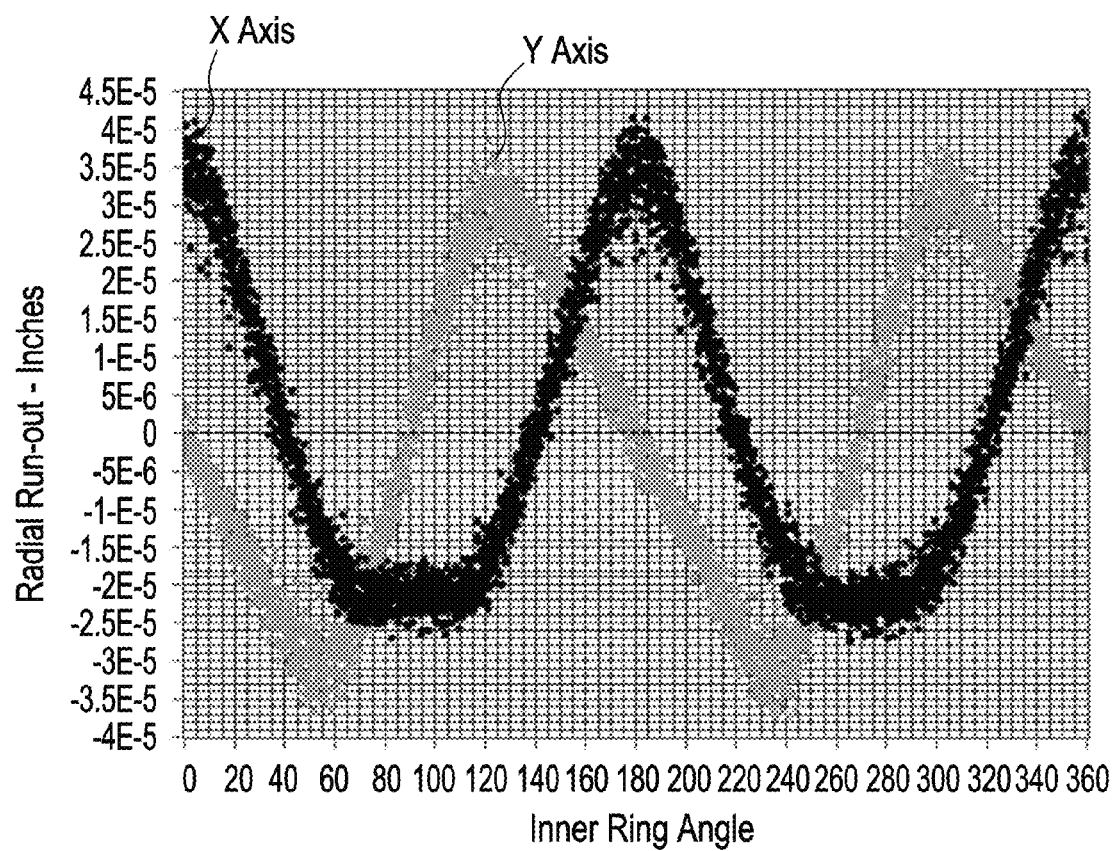
FIG. 15A provides a run-out scatter plot of a set of data results obtained from a comparison computation of non-repeatable radial run-out at an axis of the inner ring of the rolling element bearing of FIG. 14A.
Figure 15B:
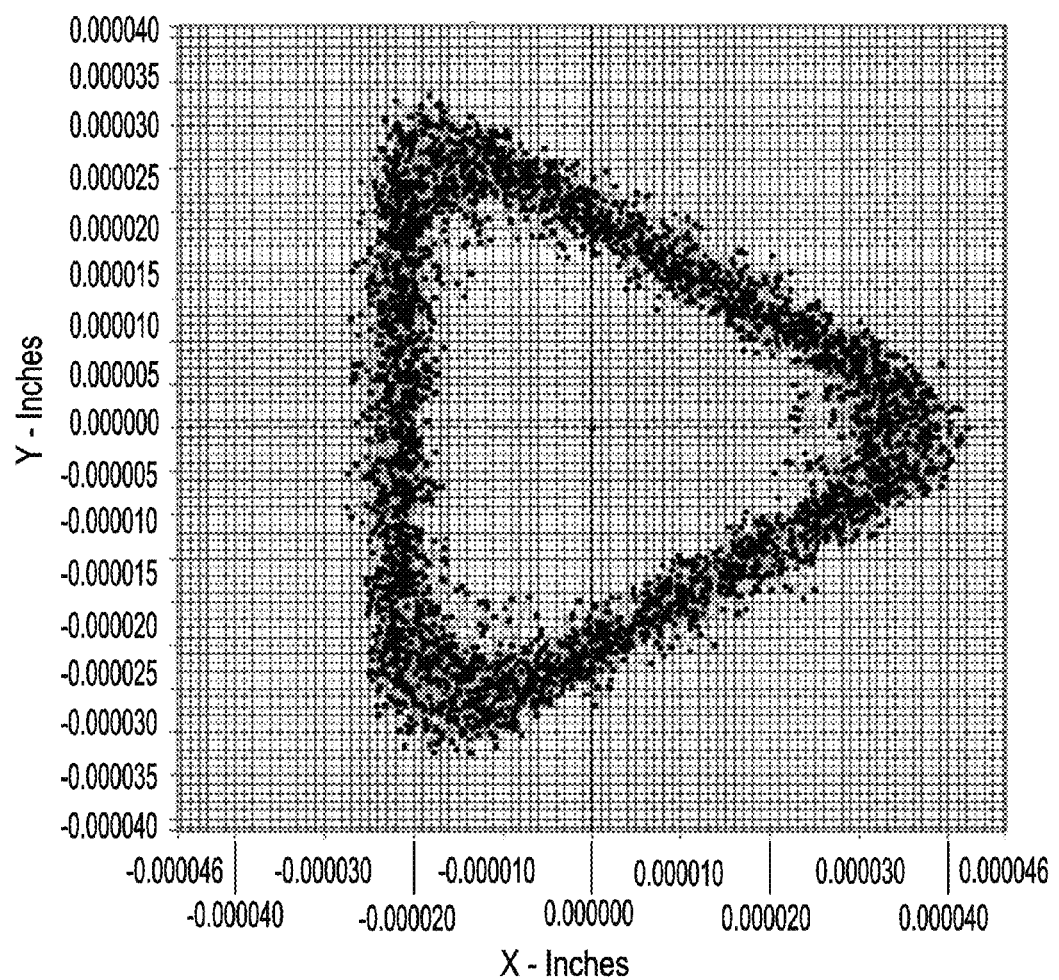
FIG. 15B provides a run-out scatter plot of a set of data results obtained from a comparison computation of non-repeatable central radial run-out of the inner ring of the rolling element bearing of FIG. 14A.

A further analysis was performed by running computations with a maximum waviness of 30µ inches over any 15° arc segment. Such a waviness tolerance can achieved with a relatively low percentage of fallout through advanced precision grinding methods. FIG. 14A provides a graphical representation of a set of data results obtained from a comparison computation of an amplitude of a non-repeatable radial run-out of another embodiment of an outer ring of a rolling element bearing in accordance with the present invention. FIG. 14B provides a graphical representation of a set of data results obtained from a comparison computation of an amplitude of a non-repeatable radial run-out of one embodiment of an inner ring of the rolling element bearing of FIG. 14A. FIG. 15A provides a run-out scatter plot of a set of data results obtained from a comparison computation of non-repeatable radial run-out at an axis of the inner ring of the rolling element bearing of FIG. 14A. FIG. 15B provides a run-out scatter plot of a set of data results obtained from a comparison computation of non-repeatable central radial run-out of the inner ring of the rolling element bearing of FIG. 14A.

FIGS. 16A-16D provide a summary of the data results shown in FIGS. 14A, 14B, 15A and 15B. As shown in FIG. 16A, radial run-outs for both the inner ring and the outer ring are in the range of 0.0003 inch. As shown in FIG. 16B, a repeatable radial run-out along the X-axis is in the range of 72µ inch and along the Y-axis is in the range of 79µ inch. As shown in FIG. 16C, a non-repeatable radial run-out along the X-axis is in the range of 18µ inch and along the Y-axis is in the range of 17µ inch. As shown in FIG. 16D a raceway waviness in any 30 degree are segment is in the range of 40µ inch; and a raceway waviness in any 15 degree are segment is in the range of 30µ inch. It should be understood that the values expressed herein and in FIGS. 16A-16D are for relative comparison only and should not be assumed to be as-delivered bearing radial run-outs.

Figure 18A:
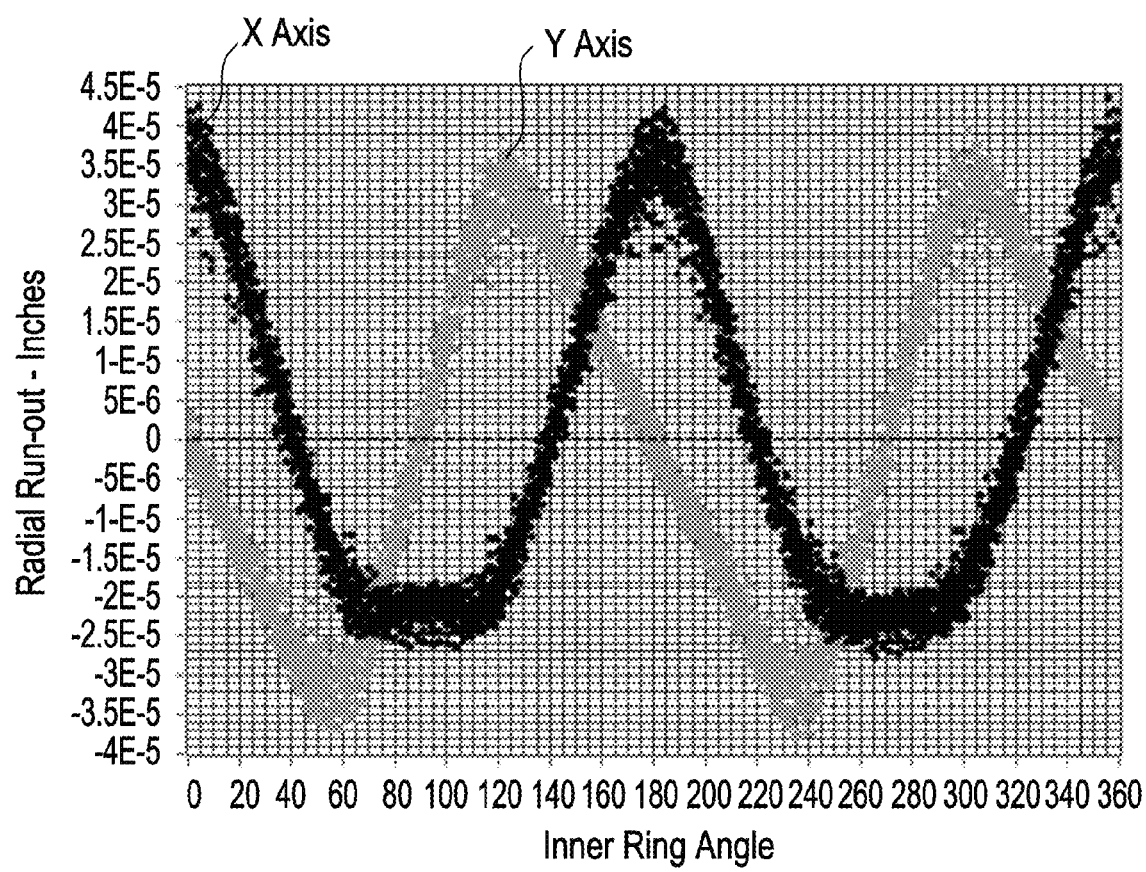
FIG. 18A provides a run-out scatter plot of a set of data results obtained from a comparison computation of non-repeatable radial run-out at an axis of the inner ring of the rolling element bearing of FIG. 17A.
Figure 18B:
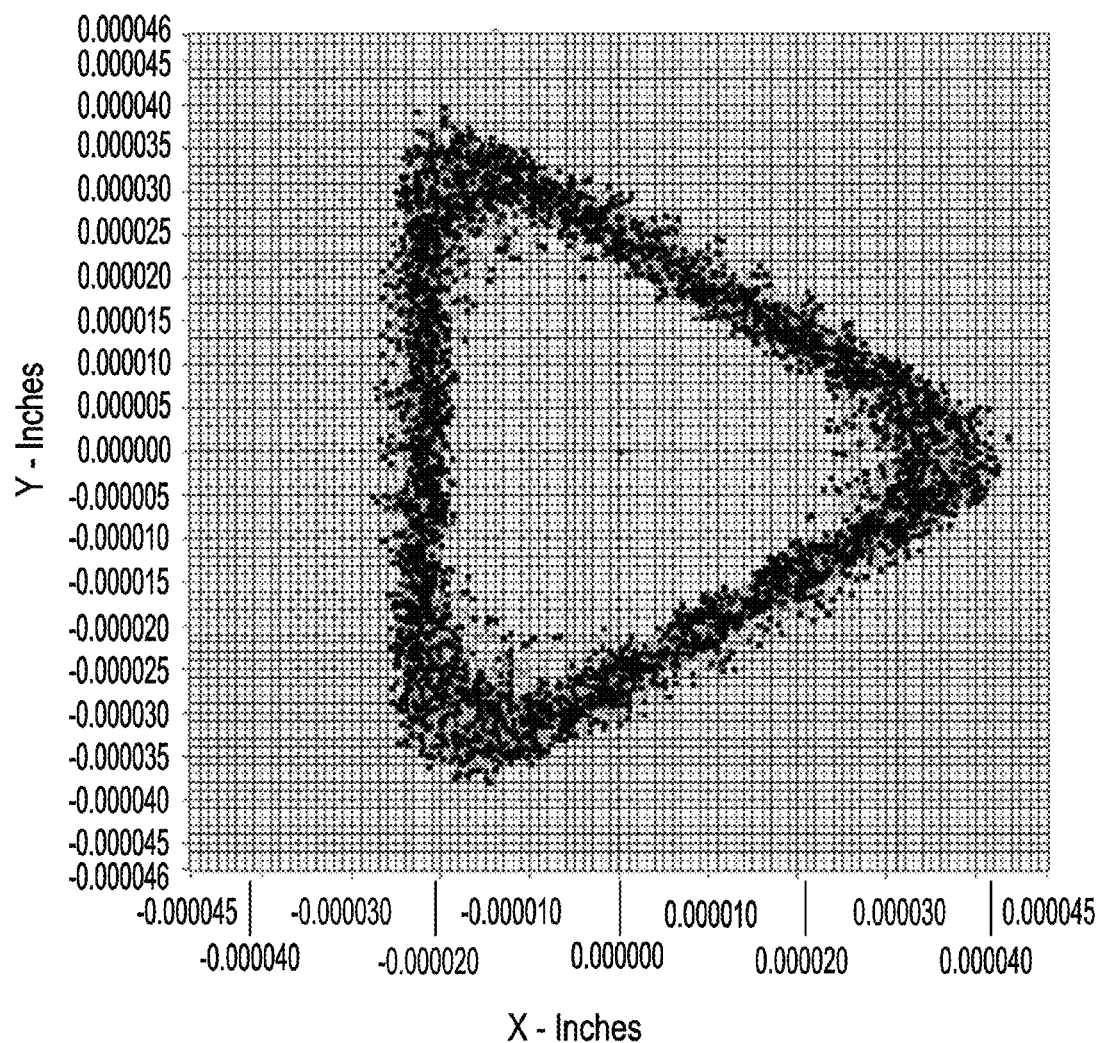
FIG. 18B provides a run-out scatter plot of a set of data results obtained from a comparison computation of non-repeatable central radial run-out of the inner ring of the rolling element bearing of FIG. 17A.

A further analysis was performed by running computations with a maximum waviness of 15µ inches over any 15° arc segment. Again, such a waviness tolerance can achieved with a relatively low percentage of fallout through advanced precision grinding methods. FIG. 17A provides a graphical representation of a set of data results obtained from a comparison computation of an amplitude of a non-repeatable radial run-out of yet another embodiment of an outer ring of a rolling element bearing in accordance with the present invention. FIG. 17B provides a graphical representation of a set of data results obtained from a comparison computation of an amplitude of a non-repeatable radial run-out of one embodiment of an inner ring of the rolling element bearing of FIG. 17A. FIG. 18A provides a run-out scatter plot of a set of data results obtained from a comparison computation of non-repeatable radial run-out at an axis of the inner ring of the rolling element bearing of FIG. 17A. FIG. 18B provides a run-out scatter plot of a set of data results obtained from a comparison computation of non-repeatable central radial run-out of the inner ring of the rolling element bearing of FIG. 17A.

FIGS. 19A-19D provide a summary of the data results shown in FIGS. 17A, 17B, 18A and 18B. As shown in FIG. 19A, radial run-outs for both the inner ring and the outer ring are in the range of 0.0003 inch. As shown in FIG. 19B, a repeatable radial run-out along the X-axis is in the range of 71µ inch and along the Y-axis is in the range of 78µ inch. As shown in FIG. 19C, a non-repeatable radial run-out along the X-axis is in the range of 13µ inch and along the Y-axis is in the range of 12µ inch. As shown in FIG. 19D a raceway waviness in any 30 degree arc segment is in the range of 30µ inch; and a raceway waviness in any 15 degree arc segment is in the range of 15µ inch. It should be understood that the values expressed herein and in FIGS. 19A-19D are for relative comparison only and should not be assumed to be as-delivered bearing radial run-outs.

An analysis of repeatable and non-repeatable radial run-outs and raceway waviness was performed, the results are presented in FIGS. 11A-19D as described below, wherein a three-point out-of-roundness was observed on the outer ring and a two-point out-of-roundness was observed on the inner ring as further described herein.

Another analysis of waviness tolerance was performed employing a low end of typical manufacturing standard deviation distribution. Again, typical manufacturing processes produce raceway waviness in the range of 150 to 50µ inches (1µ inch=0.000001 inch; or 1 millionth of an inch); and raceway waviness can vary greatly from ring to ring. For a best case scenario, comparison computations were performed with a maximum waviness of 50µ inches over any 15° arc segment.

Figure 21A:
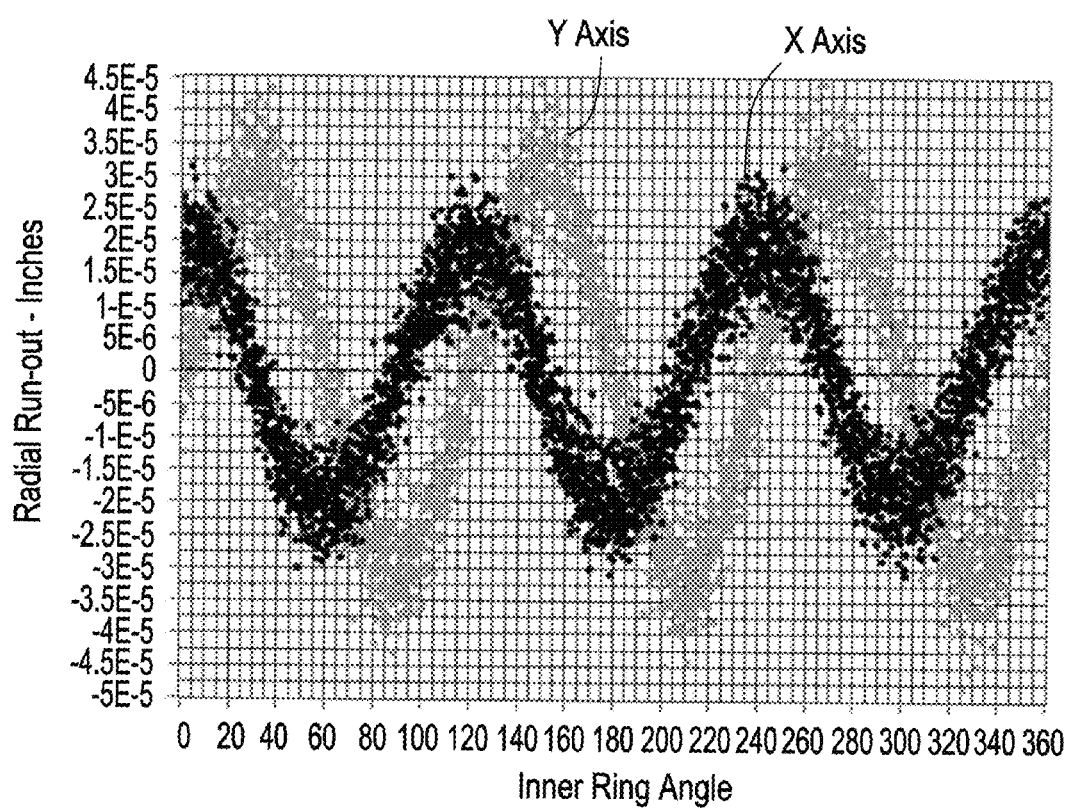
FIG. 21A provides a run-out scatter plot of a set of data results obtained from a comparison computation of non-repeatable radial run-out at an axis of the inner ring of the rolling element bearing of FIG. 20A.
Figure 21B:
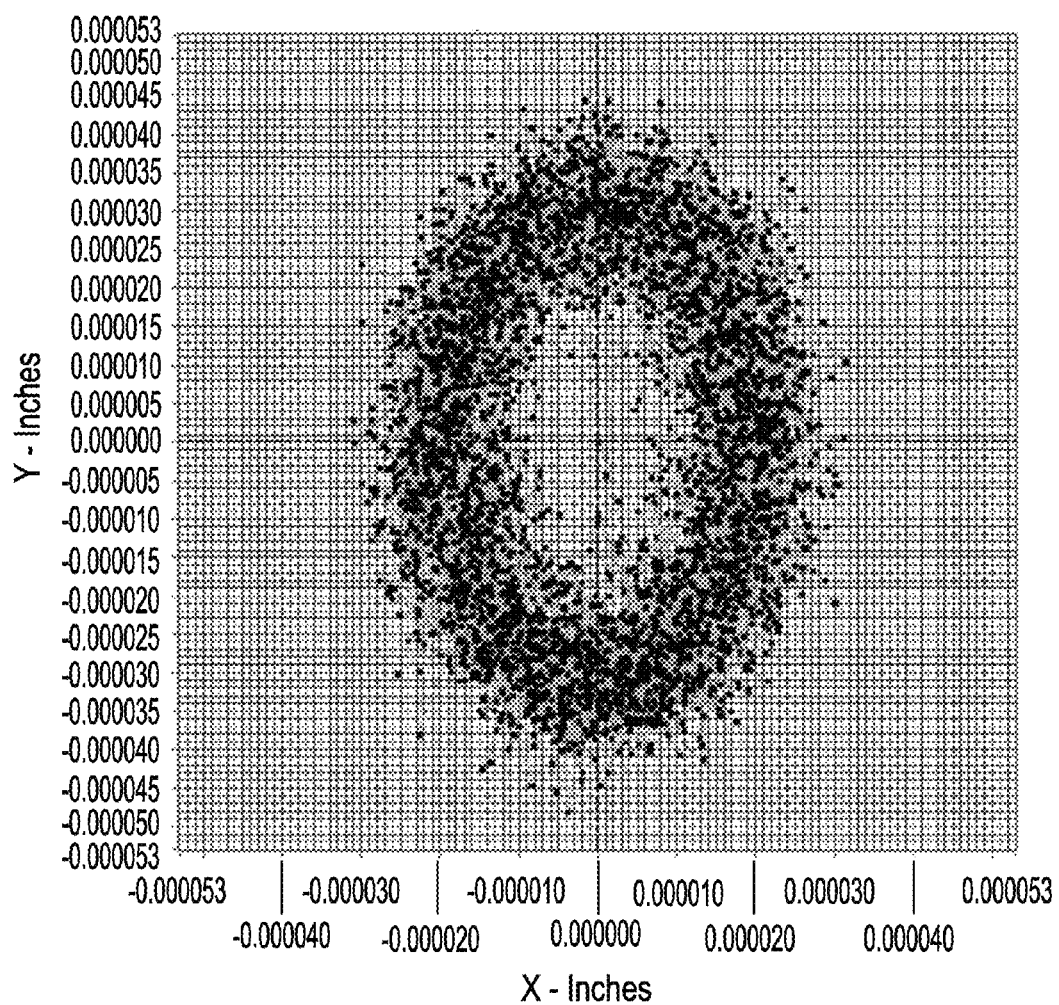
FIG. 21B provides a run-out scatter plot of a set of data results obtained from a comparison computation of non-repeatable central radial run-out of the inner ring of the rolling element bearing of FIG. 20A.

FIG. 20A provides a graphical representation of a set of data results obtained from a comparison computation of an amplitude of a non-repeatable radial run-out of yet another embodiment of an outer ring of a rolling element bearing in accordance with the present invention. FIG. 20B provides a graphical representation of a set of data results obtained from a comparison computation of an amplitude of a non-repeatable radial run-out of one embodiment of an inner ring of the rolling element bearing of FIG. 20A. FIG. 21A provides a run-out scatter plot of a set of data results obtained from a comparison computation of non-repeatable radial run-out at an axis of the inner ring of the rolling element bearing of FIG. 20A. FIG. 21B provides a run-out scatter plot of a set of data results obtained from a comparison computation of non-repeatable central radial run-out of the inner ring of the rolling element bearing of FIG. 20A.

FIGS. 22A-22D provide a summary of the data results shown in FIGS. 20A, 20B, 21A and 21B. As shown in FIG. 22A, radial run-outs for both the inner ring and the outer ring are in the range of 0.0003 inch. As shown in FIG. 22B, a repeatable radial run-out along the X-axis is in the range of 62µ inch and along the Y-axis is in the range of 93µ inch. As shown in FIG. 22C, a non-repeatable radial run-out along the X-axis is in the range of 23µ inch and along the Y-axis is in the range of 55µ inch. As shown in FIG. 22D a raceway waviness in any 30 degree arc segment is in the range of 60µ inch; and a raceway waviness in any 15 degree arc segment is in the range of 50µ inch. It should be understood that the values expressed herein and in FIGS. 22A-22B are for relative comparison only and should not be assumed to be as-delivered bearing radial run-outs.

Figure 23A:
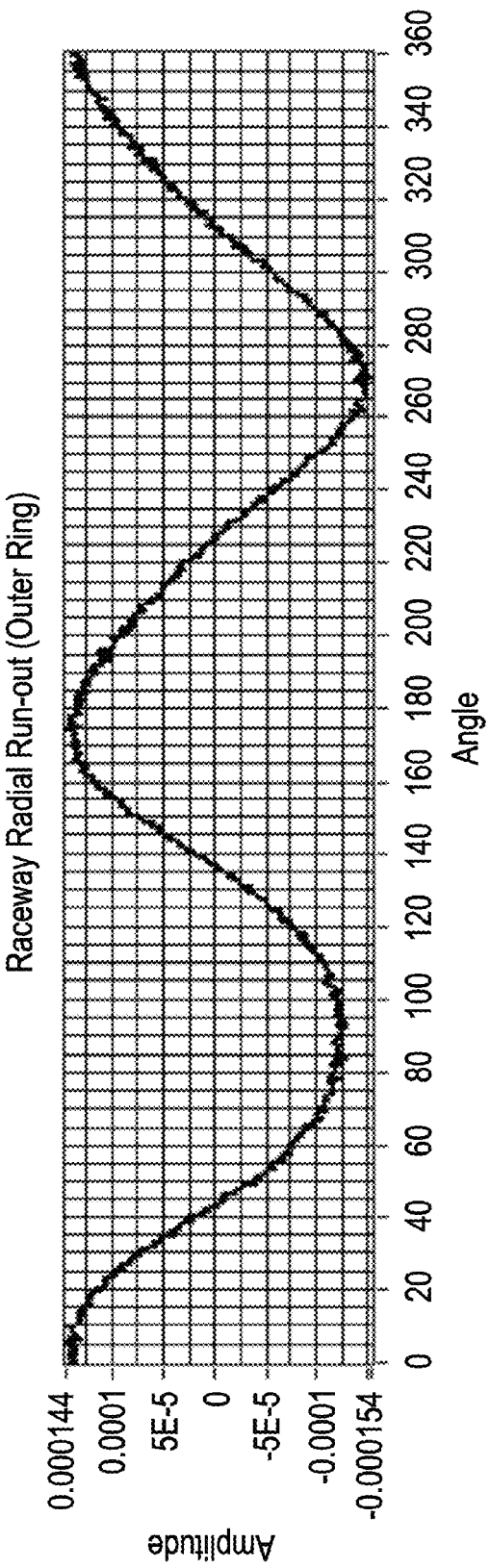
FIG. 23A provides a graphical representation of a set of data results obtained from a comparison computation of an amplitude of a non-repeatable radial run-out of yet another embodiment of an outer ring of a rolling element bearing in accordance with the present invention.
Figure 23B:
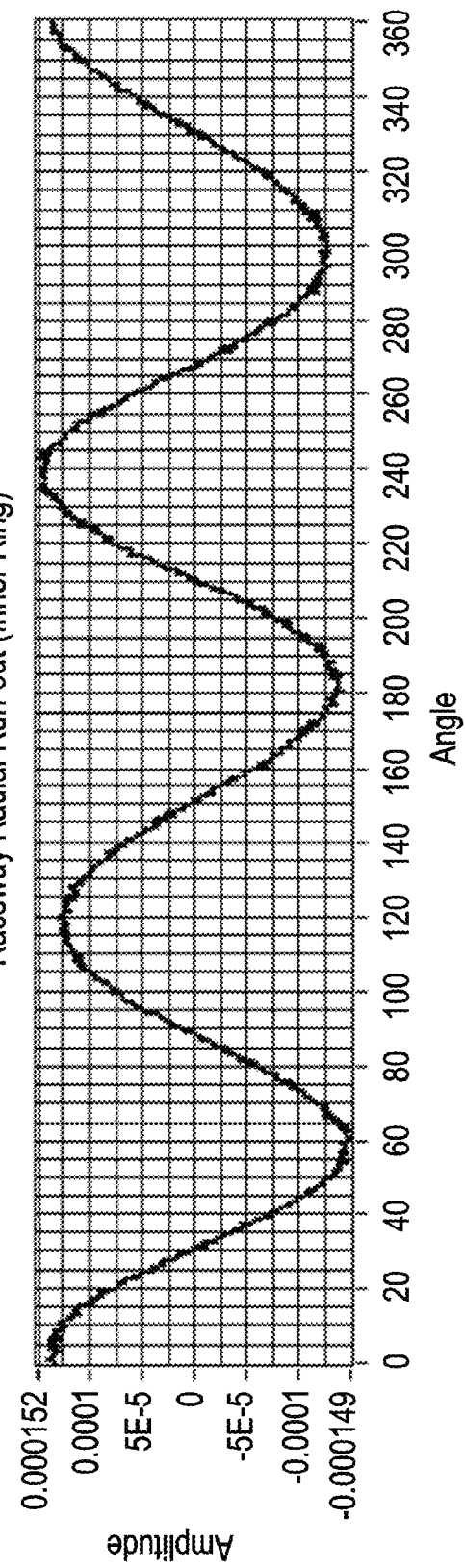
FIG. 23B provides a graphical representation of a set of data results obtained from a comparison computation of an amplitude of a non-repeatable radial run-out of one embodiment of an inner ring of the rolling element bearing of FIG. 23A.
Figure 24B:
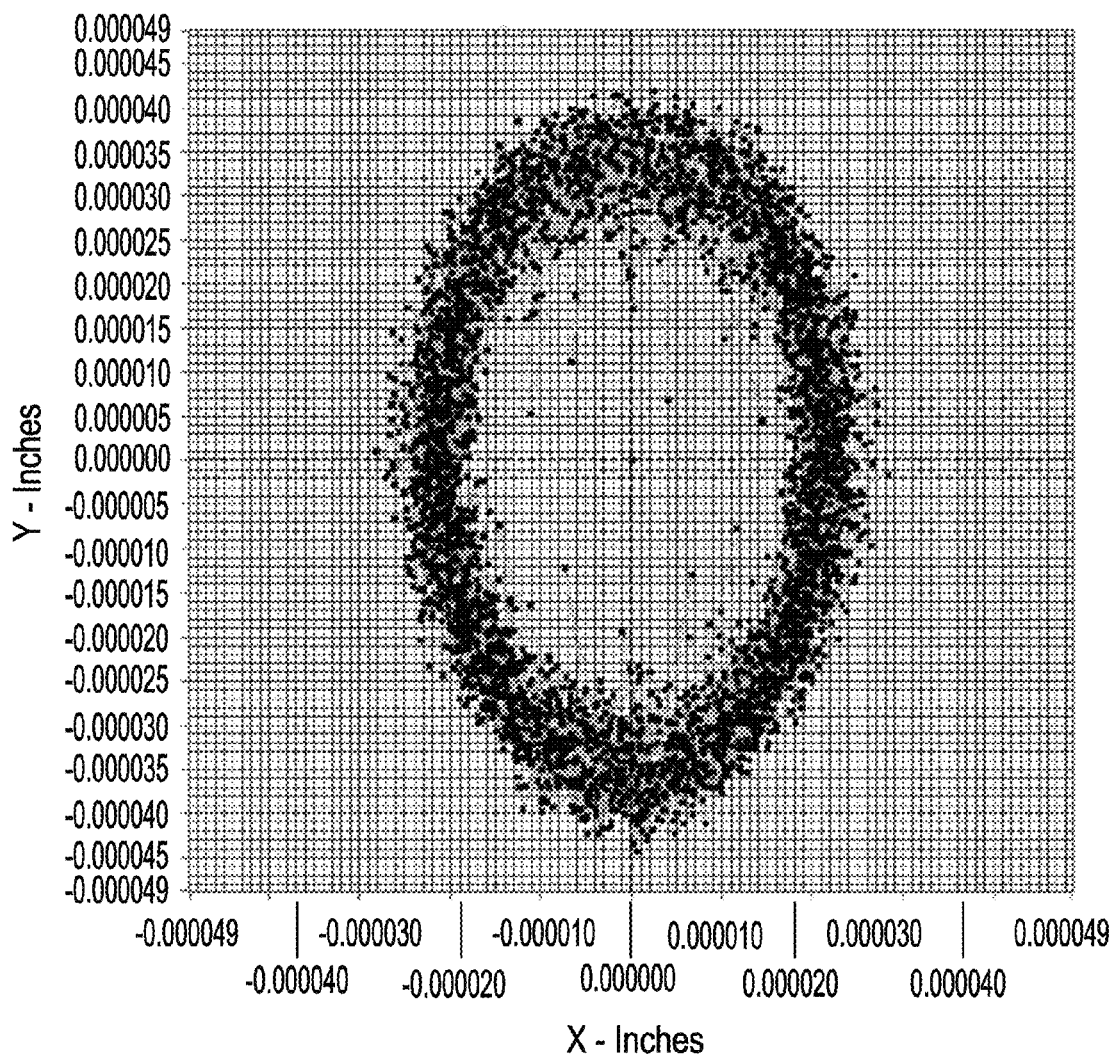
FIG. 24B provides a run-out scatter plot of a set of data results obtained from a comparison computation of non-repeatable central radial run-out of the inner ring of the rolling element bearing of FIG. 23A.

A further analysis was performed by running computations with a maximum waviness of 30µ inches over any 15° arc segment. FIG. 23A provides a graphical representation of a set of data results obtained from a comparison computation of an amplitude of a non-repeatable radial run-out of yet another embodiment of an outer ring of a rolling element bearing in accordance with the present invention. FIG. 23B provides a graphical representation of a set of data results obtained from a comparison computation of an amplitude of a non-repeatable radial run-out of one embodiment of an inner ring of the rolling element bearing of FIG. 23A. FIG. 24A provides a run-out scatter plot of a set of data results obtained from a comparison computation of non-repeatable radial run-out at an axis of the inner ring of the rolling element bearing of FIG. 23A. FIG. 24B provides a run-out scatter plot of a set of data results obtained from a comparison computation of non-repeatable central radial run-out of the inner ring of the rolling element bearing of FIG. 23A.

FIGS. 25A-25D provide a summary of the data results shown in FIGS. 23A, 23B, 24A and 24B. As shown in FIG. 25A, radial run-outs for both the inner ring and the outer ring are in the range of 0.0003 inch. As shown in FIG. 25B, a repeatable radial run-out along the X-axis is in the range of 57µ inch and along the Y-axis is in the range of 86µ inch. As shown in FIG. 25C, a non-repeatable radial run-out along the X-axis is in the range of 11µ inch and along the Y-axis is in the range of 30µ inch. As shown in FIG. 25D a raceway waviness in any 30 degree arc segment is in the range of 40µ inch; and a raceway waviness in any 15 degree arc segment is in the range of 30µ inch. It should be understood that the values expressed herein and in FIGS. 25A-25B are for relative comparison only and should not be assumed to be as-delivered bearing radial run-outs.

Figure 26A:
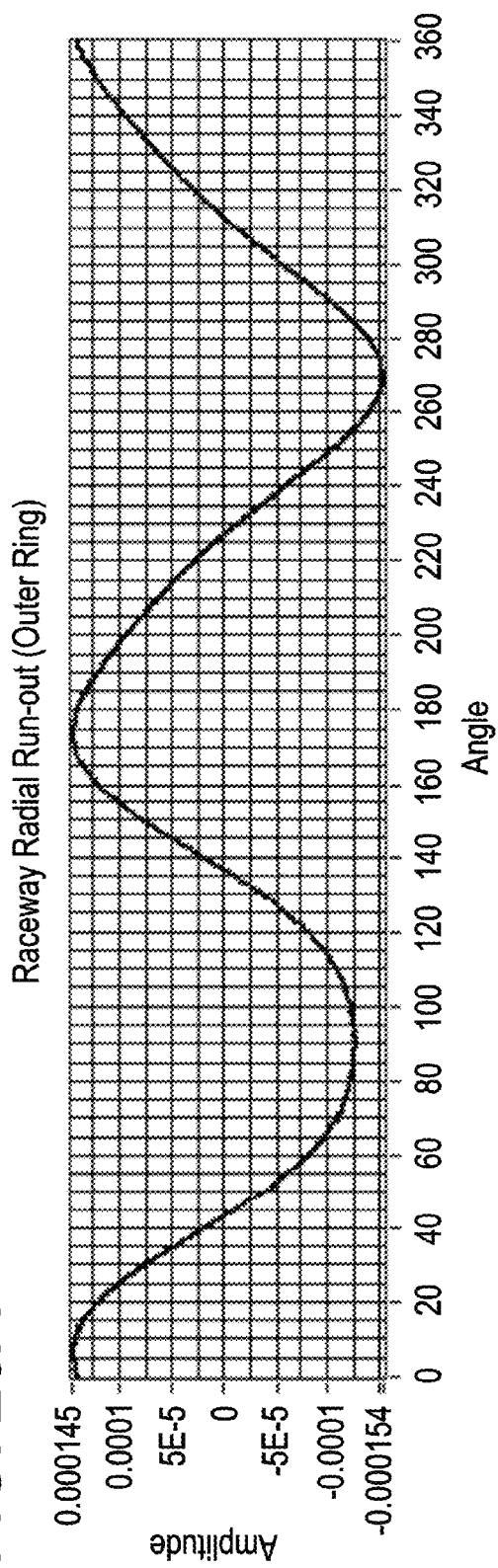
FIG. 26A provides a graphical representation of a set of data results obtained from a comparison computation of an amplitude of a non-repeatable radial run-out of yet another embodiment of an outer ring of a rolling element bearing in accordance with the present invention.
Figure 26B:
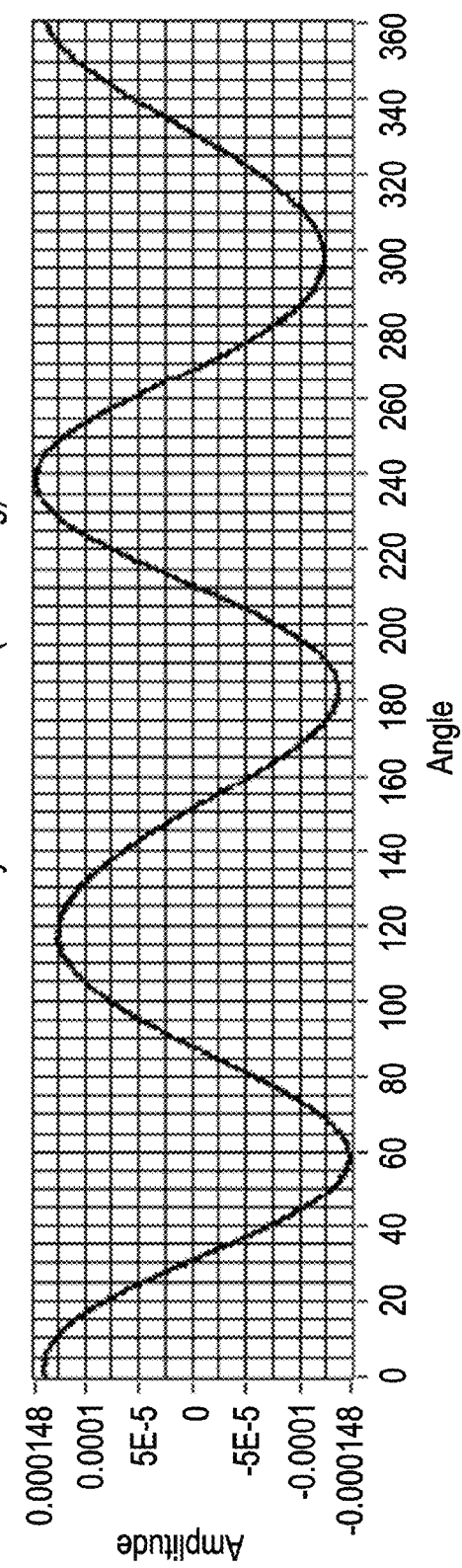
FIG. 26B provides a graphical representation of a set of data results obtained from a comparison computation of an amplitude of a non-repeatable radial run-out of one embodiment of an inner ring of the rolling element bearing of FIG. 26A.
Figure 27A:
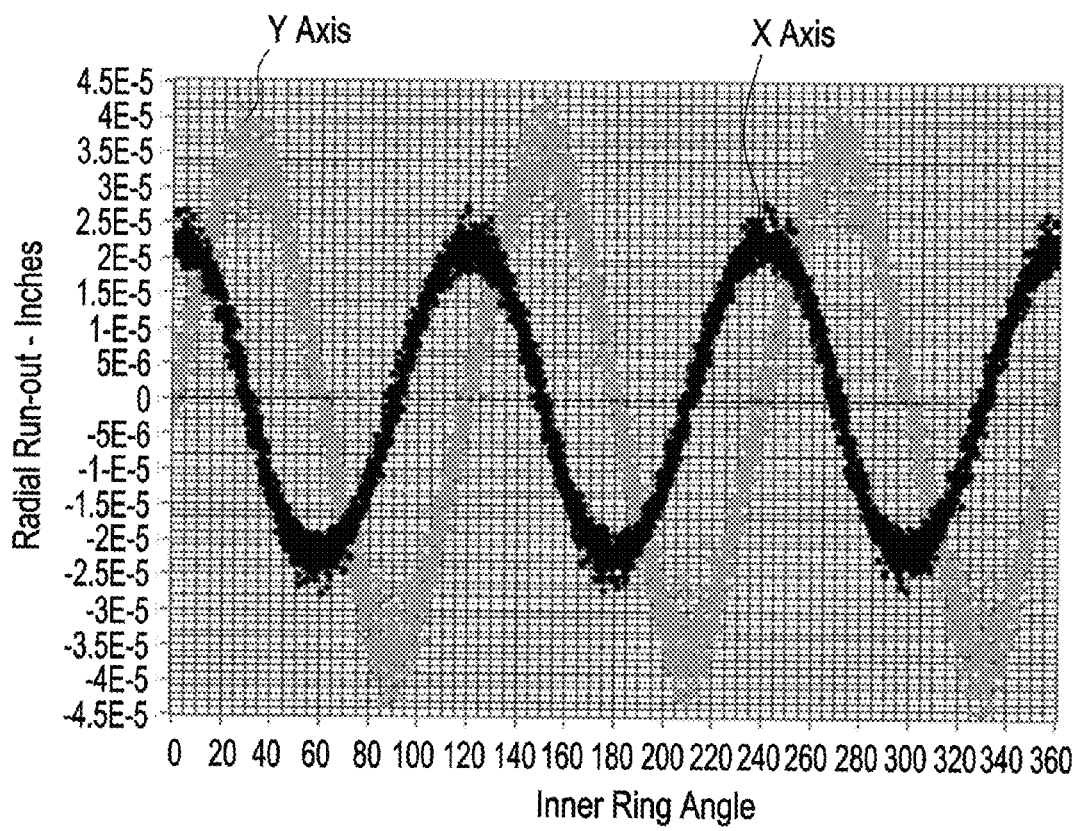
FIG. 27A provides a run-out scatter plot of a set of data results obtained from a comparison computation of non-repeatable radial run-out at an axis of the inner ring of the rolling element bearing of FIG. 26A.
Figure 27B:
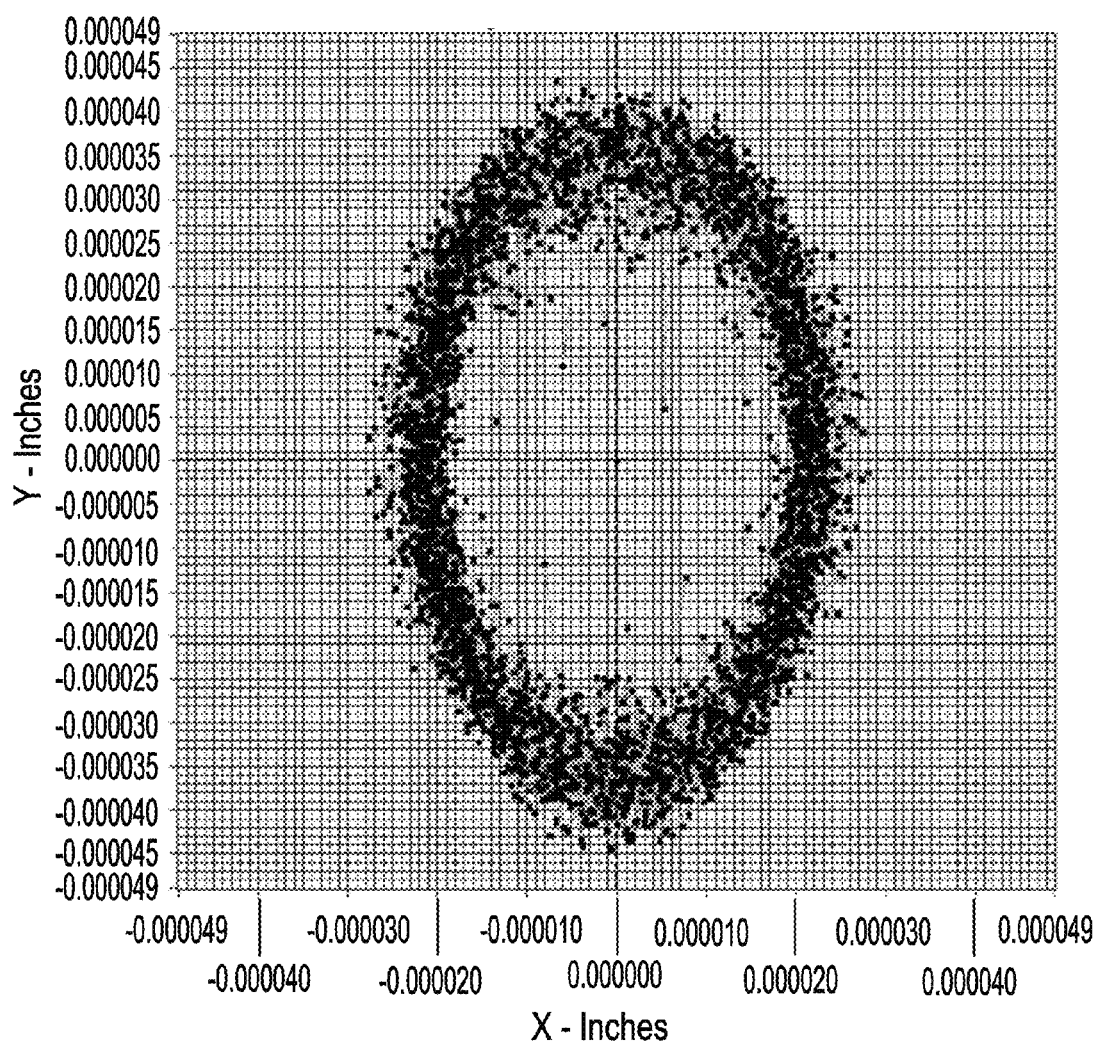
FIG. 27B provides a run-out scatter plot of a set of data results obtained from a comparison computation of non-repeatable central radial run-out of the inner ring of the rolling element bearing of FIG. 26A.

To conclude the analysis, computations were run with a maximum waviness of 15µ inches over any 15° arc segment. FIG. 26A provides a graphical representation of a set of data results obtained from a comparison computation of an amplitude of a non-repeatable radial run-out of yet another embodiment of an outer ring of a rolling element bearing in accordance with the present invention. FIG. 26B provides a graphical representation of a set of data results obtained from a comparison computation of an amplitude of a non-repeatable radial run-out of one embodiment of an inner ring of the rolling element bearing of FIG. 26A. FIG. 27A provides a run-out scatter plot of a set of data results obtained from a comparison computation of non-repeatable radial run-out at an axis of the inner ring of the rolling element bearing of FIG. 26A. FIG. 27B provides a run-out scatter plot of a set of data results obtained from a comparison computation of non-repeatable central radial run-out of the inner ring of the rolling element bearing of FIG. 26A.

FIGS. 28A-28D provide a summary of the data results shown in FIGS. 26A, 26B, 27A and 27B. As shown in FIG. 28A, radial run-outs for both the inner ring and the outer ring are in the range of 0.0003 inch. As shown in FIG. 28B, a repeatable radial run-out along the X-axis is in the range of 55µ inch and along the Y-axis is in the range of 88µ inch. As shown in FIG. 28C, a non-repeatable radial run-out along the X-axis is in the range of 9µ inch and along the Y-axis is in the range of 29µ inch. As shown in FIG. 28D a raceway waviness in any 30 degree arc segment is in the range of 30µ inch; and a raceway waviness in any 15 degree arc segment is in the range of 15µ inch. It should be understood that the values expressed herein and in FIGS. 28A-28B are for relative comparison only and should not be assumed to be as-delivered bearing radial run-outs.

As described above with reference to FIG. 4, the tabulated results show a best case of non-repeatable radial run-out in the range of 55µ inch and a system non-repeatable angular run-out in the range of a 3.75 arc segment. A waviness of a 30 degree arc segment was obtained in the range of 60µ inch; and of a 15 degree arc segment in the range of 50µ inch.

Referring back to FIG. 1B, the duplex bearing 100 is unique in that the random spacing (i.e., non-rhythmic spacing) is created by slug separators 261, 262, 263, 264 and 265 are cut at random lengths. One of the slug separators 261, 262, 263, 264 and 265 is disposed between adjacent rolling elements 40 located between the inner race 36 and the outer race 26 and one of the slug separators 261, 262, 263, 264 and 265 is disposed between adjacent rolling elements 50 located between the inner race 38 and the outer race 28. The random spacing of the rolling elements 40 and 50 created by the random length slug separators 261, 262, 263, 264 and 265 provides non-repeatable run outs and torque under combined loads compared to bearing using cages. The slug separators 261, 262, 263, 264 and 265 do not impede radial or moment loads like a cage can tend to. The slug separators 261, 262, 263, 264 and 265 are floating allowing for the rolling elements 40, 50 to be free about the pitch diameter, within the circumferential clearance inherent to the stack-up of the slugs and rolling elements. The one piece inner ring 30 and outer ring 20 with two angular contact races (26 and 36) and (28 and 38) (super duplex, full cartridge) allows for internally preloading of bearings, as shipped to the customer. This offers significant benefits in the area of non-repeatable runouts because both races (26 and 36) and (28 and 38) are ground at the same time ensuring their run-outs are in phase (for lobing) as well as concentric with each other. This combined with the non-rhythmic spacing (i.e., random spacing) of the rolling elements 40 and 50 by the slug separators 261, 262, 263, 264, 265 results in significant accuracy improvements.

The present invention also includes a plurality of duplex rolling element bearings 100 in which each of the plurality of duplex rolling element bearings 100 has a different random spacing of rolling elements 40 and 50 as a result of the random lengths of the slug separators 261, 262, 263, 264 and 265 positioned between adjacent rolling elements 40 and 50.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A rolling element bearing comprising:
   an outer member having an outer member interior surface and an outer member exterior surface;
   an inner member having an inner member interior surface and an inner member exterior surface;
   a plurality of rolling elements disposed between the inner member and the outer member; and
   a plurality of random-length slug separators wherein at least one the plurality of random-length slug separators has a first length, at least one of the plurality of random-length slug separators has a second length, and at least one of the plurality of random-length slug separators has a third length, wherein the first, second and third lengths are not equal, and wherein at least one of the plurality of random-length slug separators is disposed adjacent to at least one of the plurality of rolling elements;
   wherein the plurality of rolling elements are non-rhythmically spaced apart; and
   wherein the outer member and the inner member have radial run-outs and waviness lobe patterns that are in phase with each other.

2. The rolling element bearing of claim 1 further comprising at least one shield extending radially inwardly from the outer member toward the inner member to provide shielding for at least one of the plurality of rolling elements.

3. The rolling element bearing of claim 1 further comprising a first shield extending radially inwardly from the outer member toward the inner member to provide shielding for at least one of the plurality of rolling elements, and a second shield extending radially inwardly from the outer member toward the inner member to provide shielding for at least one other of the plurality of rolling elements.

4. The rolling element bearing of claim 1 wherein the plurality of rolling elements are fabricated from Silicon Nitride ($Si_3N_4$).

5. The rolling element bearing of claim 1 wherein the plurality of random-length slug separators are fabricated from polytetrafluoroethylene ("PTFE").

6. The rolling element bearing of claim 1 wherein the plurality of random-length slug separators are fabricated from perfluoroalkoxy ("PFA").

7. A rolling element bearing comprising:
   an outer member having an outer member interior surface and an outer member exterior surface, the outer member interior surface defining a first outer race and a second outer race;
   an inner member having an inner member interior surface and an inner member exterior surface, the inner member exterior surface defining a first inner race and a second inner race;
   a first plurality of rolling elements disposed between the first inner race and the first outer race;
   a second plurality of rolling elements disposed between the second inner race and the second outer race;
   a first plurality of random-length slug separators wherein at least one of the first plurality of random-length slug separator has a first length, at least one of the first plurality of random-length slug separator has a second length, and at least one of the first plurality of random-length slug separator has a third length, wherein the first, second and third lengths are not equal, and wherein at least one of the first plurality of random-length slug separators is disposed adjacent to at least one of the first plurality of rolling elements; and
   a second plurality of random-length slug separators wherein at least one of the second plurality of random-length slug separator has a fourth length, at least one of the second plurality random-length slug separator has a fifth length, and at least one of the second plurality random-length slug separator has a sixth length, wherein the fourth, fifth and sixth lengths are not equal, and wherein at least one of the second plurality of random-length slug separators is disposed adjacent to at least one of the second plurality of rolling elements;
   wherein each of the first and second plurality of rolling elements are non-rhythmically spaced apart; and
   wherein the outer member and the inner member have radial run-outs and waviness lobe patterns that are in phase with each other.

8. A plurality of rolling element bearings, each of the plurality of rolling element bearings comprising:
   an outer member having an outer member interior surface and an outer member exterior surface;
   an inner member having an inner member interior surface and an inner member exterior surface;

a plurality of rolling elements disposed between the inner member and the outer member; and a plurality of random-length slug separators wherein at least one the plurality of random-length slug separators has a first length, at least one of the plurality of random-length slug separator has a second length, and at least one of the plurality of random-length slug separator has a third length, wherein the first, second and third lengths are not equal, and wherein at least one of the plurality of random-length slug separators is disposed adjacent to at least one of the plurality of rolling elements; and wherein the plurality of rolling elements of each of the plurality of rolling element bearings have a different non-rhythmical spacing; and wherein the outer member and the inner member have radial run-outs and waviness lobe patterns that are in phase with each other.

9. A gimbal bearing assembly comprising:
a first rolling element bearing;
a second rolling element bearing; and
a shaft extending between the first rolling element bearing and the second rolling element bearing;
wherein each of the first rolling element bearing and the second rolling element bearing respectively comprises
an outer member having an outer member interior surface and an outer member exterior surface, the outer member interior surface defining a first outer race and a second outer race;
an inner member having an inner member interior surface and an inner member exterior surface, the inner member exterior surface defining a first inner race and a second inner race, the inner member received in the outer member such that the inner member and the outer member share a common central axis;
a first plurality of rolling elements disposed between the first inner race and the first outer race;

a second plurality of rolling elements disposed between the second inner race and the second outer race;

a first plurality of random-length slug separators wherein at least one of the first plurality of random-length slug separators is disposed adjacent to at least one of the first plurality of rolling elements, and wherein the at least one of the first plurality of random-length slug separators defines a different length than another of the first plurality of random-length slug separators; and a second plurality of random-length slug separators wherein at least one of the second plurality of random-length slug separators is disposed adjacent to at least one of the second plurality of rolling elements, and wherein the at least one of the second plurality of random-length slug separators defines a different length than another of the second plurality of random-length slug separators wherein each of the first and second plurality of rolling elements are non-rhythmically spaced apart, and wherein the outer member and the inner member have radial run-outs and waviness lobe patterns that are in phase with each other.

10. The gimbal bearing assembly of claim 9 wherein each plurality of rolling elements are non-rhythmically spaced apart.

11. The gimbal bearing assembly of claim 9 wherein each plurality of rolling elements are fabricated from Silicon Nitride ($Si_3N_4$).

12. The gimbal bearing assembly of claim 9 wherein each of the plurality of random-length slug separators are fabricated from polytetrafluoroethylene ("PTFE").

13. The gimbal bearing assembly of claim 9 wherein each of the plurality of random-length slug separators are fabricated from perfluoroalkoxy ("PFA").

\* \* \* \* \*